US 9,760,644 B2

(12) United States Patent
Khvostichenko et al.

(10) Patent No.: US 9,760,644 B2
(45) Date of Patent: Sep. 12, 2017

(54) EMBEDDING EVENT CREATION LINK IN A DOCUMENT

(71) Applicant: Google Inc., Mountain View, CA (US)

(72) Inventors: Boris Khvostichenko, Gattikon (CH); Karol Piotr Stosiek, Zurich (CH)

(73) Assignee: Google Inc., Mountain View, CA (US)

( * ) Notice: Subject to any disclaimer, the term of this patent is extended or adjusted under 35 U.S.C. 154(b) by 487 days.

(21) Appl. No.: 13/865,131

(22) Filed: Apr. 17, 2013

(65) Prior Publication Data

US 2015/0193391 A1    Jul. 9, 2015

(51) Int. Cl.
  *G06F 17/27* (2006.01)
  *G06F 17/30* (2006.01)
  *G06Q 10/00* (2012.01)

(52) U.S. Cl.
  CPC .... *G06F 17/30876* (2013.01); *G06F 17/2765* (2013.01); *G06Q 10/00* (2013.01)

(58) Field of Classification Search
  CPC ...................................... G06F 17/24
  USPC ........................................ 715/205
  See application file for complete search history.

(56) References Cited

U.S. PATENT DOCUMENTS

| | | | |
|---|---|---|---|
| 4,839,853 A | 6/1989 | Deerwester et al. | |
| 4,965,763 A | 10/1990 | Zamora | |
| 5,966,686 A | 10/1999 | Heidorn et al. | |
| 5,999,938 A | 12/1999 | Bliss et al. | |
| 6,216,110 B1 | 4/2001 | Silverberg | |
| 6,285,999 B1 | 9/2001 | Page | |
| 6,369,840 B1 | 4/2002 | Barnett et al. | |

(Continued)

FOREIGN PATENT DOCUMENTS

| | | |
|---|---|---|
| EP | 1104151 A2 | 5/2001 |
| EP | 1109121 A2 | 6/2001 |

(Continued)

OTHER PUBLICATIONS

30 Boxes—Help, One Box Entry, retrieved from http://www.30boxes.com/help.php, Mar. 20, 2006, 2 pages.

(Continued)

*Primary Examiner* — Kavita Padmanabhan
*Assistant Examiner* — Tionna Burke
(74) *Attorney, Agent, or Firm* — Brake Hughes Bellermann LLP

(57) ABSTRACT

A method, system, and data structure for creating electronic calendar entries or calendar events are disclosed. A web document is obtained. A first parameter of an event is identified, and a parameter complementary to the first parameter is also identified. The complementary parameter is identified, from among a plurality of candidate parameters. Each parameter corresponds to a distinct text portion of the web document. The complementary parameter is identified in accordance with a distance metric between the text portion of the web document corresponding to the first parameter and the text portion of the web document corresponding to the complementary parameter. Then an event creation link is created and embedded in the web document. The event creation link contains event information corresponding to at least the first parameter and the complementary parameter. The web document, including the embedded event creation link, is provided for display.

19 Claims, 19 Drawing Sheets

(56) References Cited

U.S. PATENT DOCUMENTS

| | | | |
|---|---|---|---|
| 7,058,652 | B2* | 6/2006 | Czarnecki et al. |
| 2002/0194379 | A1 | 12/2002 | Bennett et al. |
| 2003/0115188 | A1 | 6/2003 | Srinivasa et al. |
| 2004/0034635 | A1 | 2/2004 | Czarnecki et al. |
| 2004/0243677 | A1 | 12/2004 | Curbow et al. |
| 2005/0021858 | A1 | 1/2005 | Ruston et al. |
| 2005/0091095 | A1 | 4/2005 | Wilbrink et al. |
| 2005/0149858 | A1 | 7/2005 | Stern et al. |
| 2005/0261011 | A1 | 11/2005 | Scott |
| 2007/0073810 | A1 | 3/2007 | Adams et al. |
| 2007/0130275 | A1 | 6/2007 | Maresh |
| 2007/0150513 | A1* | 6/2007 | Vanden Heuvel et al. ............ 707/104.1 |
| 2007/0226204 | A1 | 9/2007 | Feldman |
| 2009/0292698 | A1* | 11/2009 | Remy .............. G06F 17/30616 |
| 2013/0156288 | A1* | 6/2013 | Chinnaswamy et al. ..... 382/135 |
| 2014/0149106 | A1* | 5/2014 | Beretta ................ G06F 17/273 704/9 |

FOREIGN PATENT DOCUMENTS

| | | |
|---|---|---|
| EP | 1808802 A1 | 7/2007 |
| WO | 99/38079 A1 | 7/1999 |

OTHER PUBLICATIONS

Black, et al, "Automated Event Extraction From Email", 2004, 12 pages.
Califf, et al, "Relational Learning of Pattern-Match Rules for Information Extraction", Proceedings CoNLL 97, 1997, 7 pages.
Carvalho, et al, "On the Collective Classification of Email 'Speech Acts'", SIGIR'05, Salvador, Brazil, Aug. 15-19, 2005, 6 pages.
Chinchor, "Overview of MUC-7/MET-2", Proceedings of the 7th Message Understanding Conference, Mar. 8, 2005, 5 pages.
Ciravegna, "(LP)2: Rule Induction for Information Extraction Using Linguistic Constraints", Technical Report CS-03-07, Dept of Computer Science, University of Sheffield, U.K., Sep. 29, 2003, 29 pages.
Corston-Oliver, et al, "Integration of Email and Task Lists", 2004, 2 pages.
"Creating a Calendar Entry From a Lotus Notes Email", Morgan, Lewis & Bockius, LLP, Technical Tips (internal firm document), Oct. 7, 2005, 2 pages.
Dawson, et al., "Internet Calendaring and Scheduling Core Object Specification (iCalendar)", Network Working Group, Request for Comments: 2445, Nov. 1998, 139 pages.
Freitag, "Using Grammatical Inference to Improve Precision in Information Extraction", ICML-97 Workshop on Automata Induction, Grammatical Inference, and Language Acquisition, Nashville, Tennessee, Jul. 1997, 10 pages.
"hCalendar", Developers Wiki—hCalendar, retrieved from http://developers.technorati.com/wiki/hCalendar?action=print, 2004, 6 pages.
Hogue, et al., "Thresher: Automating the Unwrapping of Semantic Content from the World Wide Web", WWW 2005, May 10-14, 2005, Chiba, Japan, pp. 86-95.

International Search Report for PCT Application PCT/US2007/066576, Oct. 2, 2007, 4 pages.
Jackson, et al, "SEXY: The Stanford Event eXtraction sYstem", CS444A Dependable Computer Systems Project, Dec. 2, 2003, 15 pages.
Mani, "Recent Developments in Temporal Information Extraction", Proceedings of RANLP, 2004, 18 pages.
Minkov, et al., "Extracting Personal Names from Emails: Applying Named Entity Recognition to Informal Text", Assoc. of Computational Linguistics, 2004, 26 pages.
Modi, et al., "CMRadar: A Personal Assistant Agent for Calendar Management", 6th International Workshop on Agent-Oriented Information Systems (AOIS), 2004, 15 pages.
"MUC-7 Table of Content", Message Understanding Conference Proceedings, Mar. 8, 2005, 5 pages.
New Media Crossroads—Blog Archive, "30 Boxes v. Spongecell Using Natural Language Entry", retrieved from http://www.pollackmediagroup.net/wordpress/?p=49, Mar. 9, 2006, 10 pages.
Payne, et al., "Calendar Agents on the Semantic Web", IEEE Intelligent Systems, May/Jun. 2002, pp. 84-86.
Resig, "Date Extraction", retrieved from http://ejohn.org/blog/date_extraction, Mar. 28, 2005, 2 pages.
Search Engine Journal, "Screenshots of Google Calendar CL2 from Tech Crunch", http://www.searchenginejournal.com/?p=3067, Mar. 8, 2006, 4 pages.
"Sharing Microsoft Outlook Calendar and Contacts", retrieved on Jun. 22, 2005 from http://www.slipstick.com/outlook/share.htm, pp. 1-9.
Soffront Software Inc., "Soffront Outlook Integration Datasheet", A New Level of Productivity and Effectiveness, 2005, 4 pages.
"Spongecell—the absorbful calendar", retrieved from http://spongecell.com/, Mar. 21, 2006, 23 pages.
Spongecell Press Release, "New Spongecell calendar the easiest online planning tool for friends to share", retrieved from http://spongecell.com/info/press_release, Mar. 21, 2006, 1 page.
"Spongecell releases natural language Calendaring API", retrieved from http://digg.com/technology/spongecell_releases_natural_language_calendaring_API, Mar. 21, 2006, 1 page.
Stevenson, "PluggedIn: Online Calendars Make a Comeback", Yahoo News, Jun. 17, 2005, 2 pages.
Techcrunch, "30 Boxes Ready to Take Out Online Calendar Space", retrieved from http://www.techcrunch.com/2006/03/11/30-boxes-ready-to-take-out-online-calendar-space/, Mar. 11, 2006, 15 pages.
Techcrunch, "Exclusive Screenshots: Google Calendar", retrieved from http://www.techcrunch.com/2006/03/08/exclusive-screenshots-google-calendar/, Mar. 8, 2006, 17 pages.
Techcrunch, "SpongeCell, an Ajax Calendar", retrieved from http://www.techcrunch.com/2006/01/30/spongecell-an-ajax-calendar/, Jan. 30, 2006, 11 pages.
Yee, "User-Directed Screen Reading for Context Menus on Freeform Text", CHI 2003, Ft. Lauderdale, FL, Apr. 5-10, 2003, 2 pages.
Zhou, et al, "Named Entity Recognition using an HMM-based Chunk Tagger", Proc. 40th ACL, Philadelphia, PA, Jul. 2002, pp. 473-480.

* cited by examiner

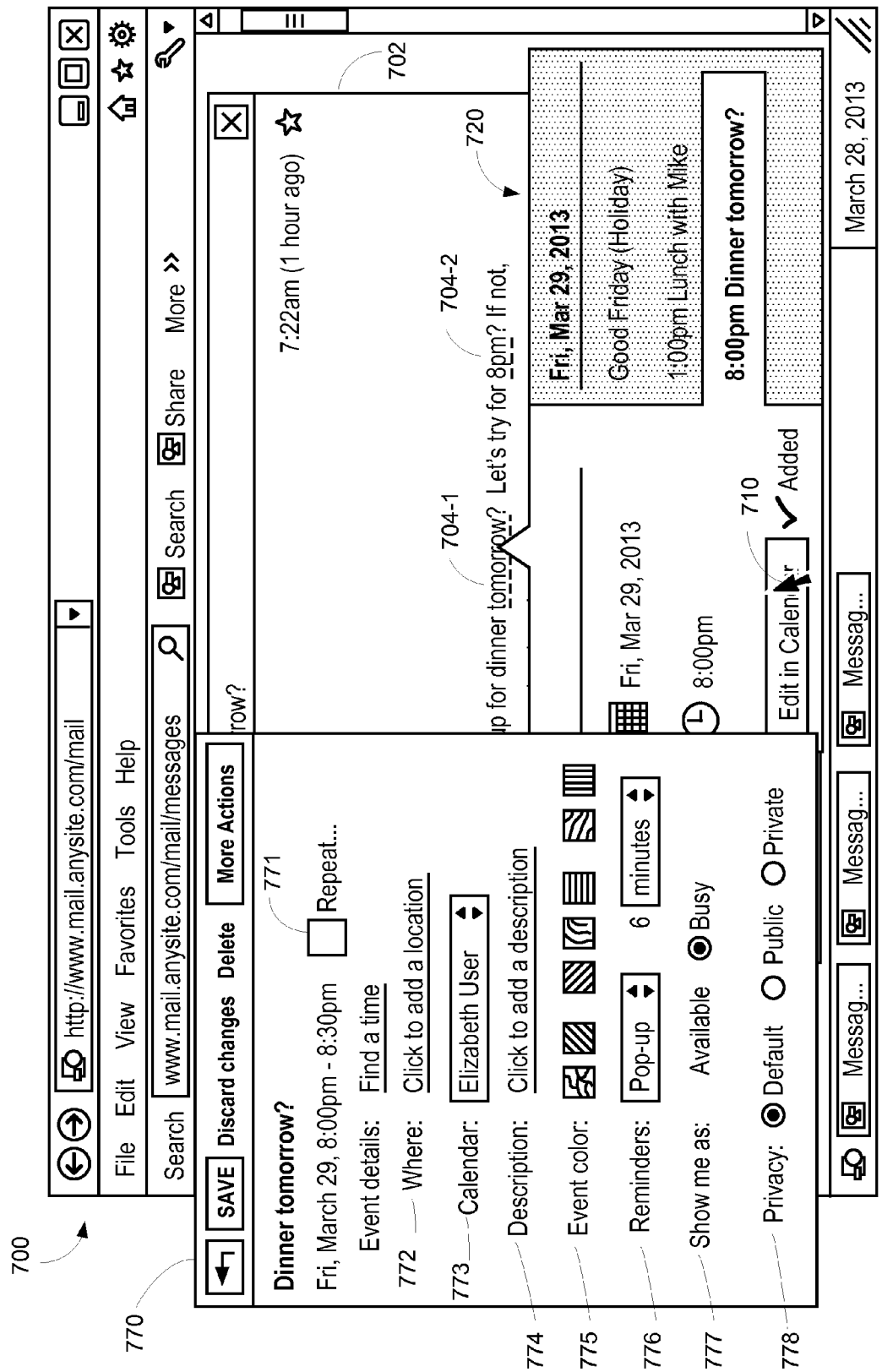

FIG. 7I

EMBEDDING EVENT CREATION LINK IN A DOCUMENT

RELATED APPLICATIONS

This application is related to U.S. patent application Ser. No. 13/865,135, filed Apr. 17, 2013 entitled "User Interface for Quickly Checking Agenda and Creating New Events", which is incorporated by reference herein in its entirety.

This application is also related to U.S. patent application Ser. No. 13/761,021 filed on Feb. 6, 2013, which is a continuation of U.S. patent application Ser. No. 13/584,751, filed Aug. 13, 2012, which is a continuation of U.S. patent Ser. No. 13/296,985, filed Nov. 15, 2011, now U.S. Pat. No. 8,244,821, which is a continuation of U.S. patent application Ser. No. 11/734,682, filed Apr. 12, 2007, now U.S. Pat. No. 8,060,567, which claims the benefit of U.S. Provisional Patent Application No. 60/791,959, titled "Method, System, Graphical User Interface, and Data Structure for Creating Electronic Calendar Entries from Email Messages," filed Apr. 12, 2006, which applications are incorporated by reference herein in their entireties.

TECHNICAL FIELD

The disclosed embodiments relate generally to electronic calendars. More particularly, the disclosed embodiments relate to methods, systems, graphical user interfaces, and data structures for creating electronic calendar entries from web documents such as email messages.

BACKGROUND

Electronic calendars are increasingly used to organize our lives. Such calendars are accessed from both desktop computers and portable computing devices (e.g., laptop computers, personal digital assistants (PDAs), mobile phones, and wearable computers).

One problem that limits more widespread use of electronic calendars is the process of filling out electronic calendar entries, which can be cumbersome and inefficient. Users typically must type or cut-and-paste data from another document into multiple calendar fields (e.g., date, start time, end time, location, activity, and people involved).

Thus, it would be highly desirable to find new, more efficient ways to create electronic calendar entries from web documents such as email messages.

SUMMARY

The present invention overcomes the limitations and disadvantages described above by providing methods, systems, GUIs, and data structures for creating electronic calendar entries from web documents as described herein.

Various embodiments of systems, methods, and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used. The following presents a summary of some of the embodiments in order to provide a basic understanding of some of the aspects of these embodiments. This summary is not an extensive overview. It is not intended to identify key/critical elements of or to delineate the scope of the invention. Its sole purpose is to present some of the concepts in a simplified form as a prelude to the more detailed description that is presented later.

In some embodiments, a first parameter is identified in a web document, such as an email message or conversation. A parameter complementary to the first parameter is also identified, from among a plurality of candidate parameters. Each parameter corresponds to a distinct text portion of the web document. In some embodiments, the complementary parameter is identified in accordance with a distance metric between the text portion of the web document corresponding to the first parameter and the text portion of the web document corresponding to the complementary parameter. Then an event creation link is created and embedded in the web document. The event creation link contains event information corresponding to at least the first parameter and the complementary parameter. The web document, including the embedded event creation link, is provided for display.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIGS. 7A-7I are schematic screen shots of exemplary graphical user interfaces for creating an electronic calendar entry from web documents in accordance with some embodiments.

DESCRIPTION OF EMBODIMENTS

Figure 1:
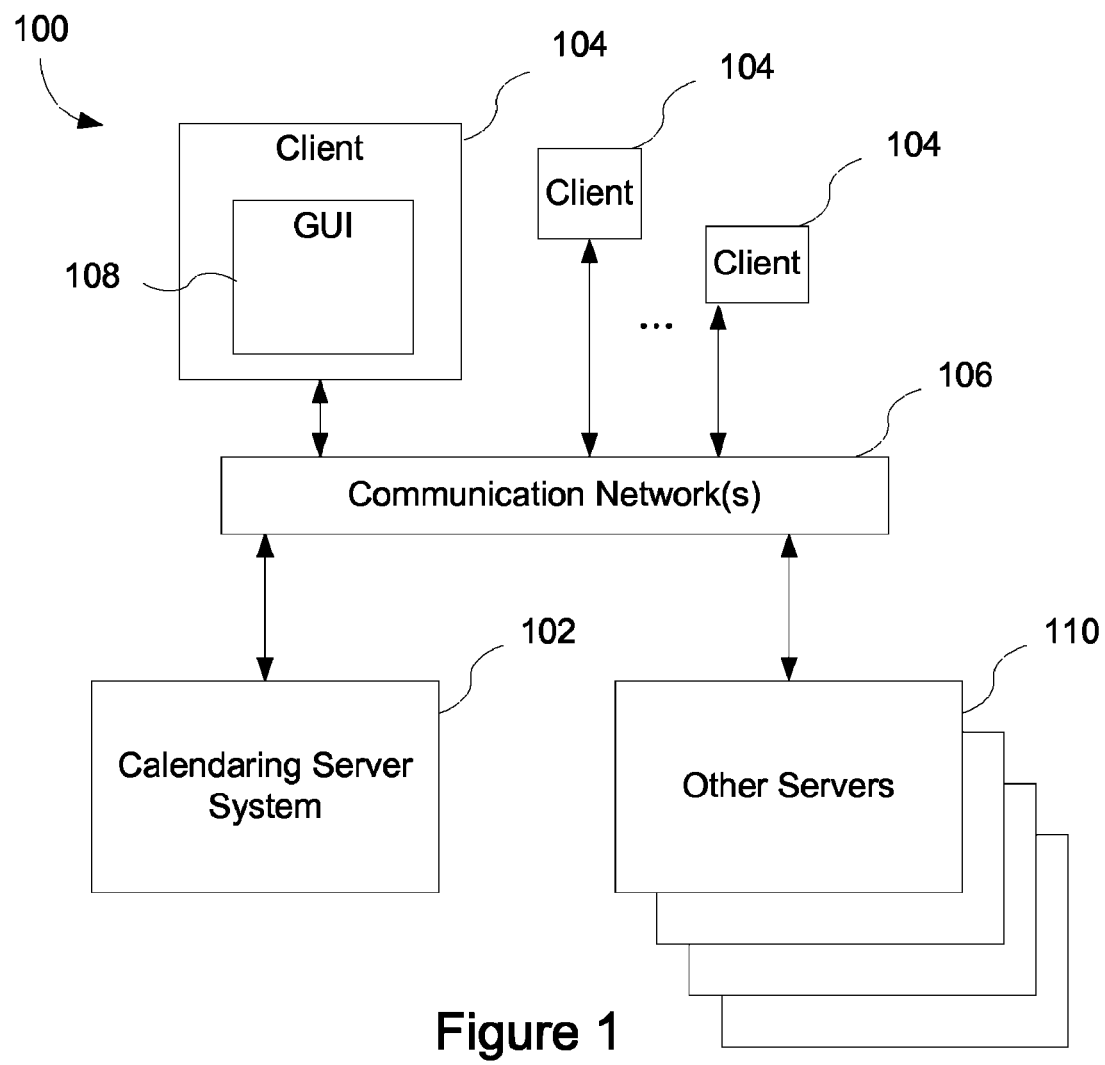
FIG. 1 is a block diagram illustrating an exemplary distributed computer system in accordance with some embodiments.

Methods, systems, GUIs, and data structures for creating electronic calendar entries are described. Reference will be made to certain embodiments examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

Some embodiments provide a computer-implemented method in which a computer system having one or more processors and memory storing one or more programs for execution by the one or more processors performs the following. A web document is obtained. A first parameter of an event is identified, and a parameter complementary to the first parameter is also identified. The complementary parameter is identified, from among a plurality of candidate parameters. Each parameter corresponds to a distinct text portion of the web document. The complementary parameter is identified in accordance with a distance metric between the text portion of the web document corresponding to the first parameter and the text portion of the web document corresponding to the complementary parameter. Then an event creation link is created and embedded in the web document. The event creation link contains event information corresponding to at least the first parameter and the complementary parameter. The web document, including the embedded event creation link, is provided for display.

In some embodiments, the method of identifying the first and the complementary parameters is performed more specifically as follows. A first text portion of the web document that describes the first parameter of the event is identified. Then second and third text portions of the web document that describe second and third parameters, respectively, are identified. The second and third parameters potentially correspond to the event, and complement the first parameter. For example, the first parameter may be a time of day for an event and the second and third parameters may be potential dates for an event. A first distance metric is determined for the second text portion, corresponding to a textual distance between the first text portion and the second text portion. A second distance metric is determined for the third text portion, corresponding to a textual distance between the first text portion and the third text portion. A text portion is selected (from among the second text portion and the third text portion) in accordance with the first distance metric (for the second text portion) and the second distance metric (for the third text portion). The complementary parameter is then identified as the parameter described by the selected text portion.

Other embodiments involve a computer-implemented method in which a computer system having one or more processors and memory storing one or more programs for execution by the one or more processors performs the following. A web document is obtained. A plurality of parameters for an event described in one or more distinct text portions of the web document is determined (by, for example, the methods(s) described in the preceding paragraphs.) The web document is provided for display, including one or more event creation links. Each event creation link corresponds to a distinct text portion of the web document associated with a respective parameter for the event (such as the date or the time of the event.) In some embodiments, the web document is provided for display with the respective distinct text portions lightly underlined or otherwise visually distinguished from remaining text. The web document further includes embedded instructions to change a visual appearance of the distinct text portion of the web document corresponding to a respective event creation link in the web document, without activating the respective event creation link, in response to a predefined user action. For example, in some embodiments, when user hovers over the distinct text portion (e.g., lightly underlined date or time) its appearance changes to a traditional hyperlink display (e.g., dark grey text with solid underlining). Furthermore, activation of the event creation link in the web document invokes display of an editable electronic calendar entry form with multiple fields containing event information from the event creation link.

Yet other embodiments involve a computer-implemented method in which a client computer receives a web document (such as email message), with an embedded event creation link, from a remote computer. The web document includes one or more event creation links each corresponding to a distinct text portion of the web document associated with a parameter for an event. The client displays the web document. The client also changes a visual appearance of the distinct text portion of the web document corresponding to a respective event creation link in the web document, without activating the respective event creation link, in response to a predefined user action. In some embodiments, the predefined user action is a mouse hover over the distinct text portion. In response to activation of the embedded event creation link, the client computer displays an editable electronic calendar entry form with multiple fields. The multiple fields contain event information from the embedded event creation link.

Some embodiments provide one or more computer systems comprising one or more central processing units, CPU(s), for executing programs and also include memory sorting the programs to be executed by the CPUs. The programs include instructions to perform any of the embodiments of the aforementioned methods. Some embodiments of the computer system also include program instructions to execute the additional options discussed above.

Yet other embodiments provide a non-transitory computer readable storage medium storing one or more programs configured for execution by a computer. The programs include instructions to perform any of the embodiments of the aforementioned methods. Some embodiments of the non-transitory computer readable storage medium also include program instructions to execute the additional options discussed above.

Thus, these methods, systems, GUIs, and data structures provide new, more efficient ways to create electronic calendar entries from web documents such as email messages.

FIG. 1 is a block diagram illustrating an exemplary distributed computer system 100 according to one embodiment of the invention. FIG. 1 shows various functional components that will be referred to in the detailed discussion that follows. This system includes client computers 104, calendaring server system 102, other servers 110 (such as email servers and web hosting servers), and communication network(s) 106 for interconnecting these components.

Client computer 104 can be any of a number of computing devices (e.g., an internet kiosk, personal digital assistant, cell phone, desktop computer, or laptop computer) used to enable the activities described below. Client 104 includes graphical user interface (GUI) 108.

Figure 2A:
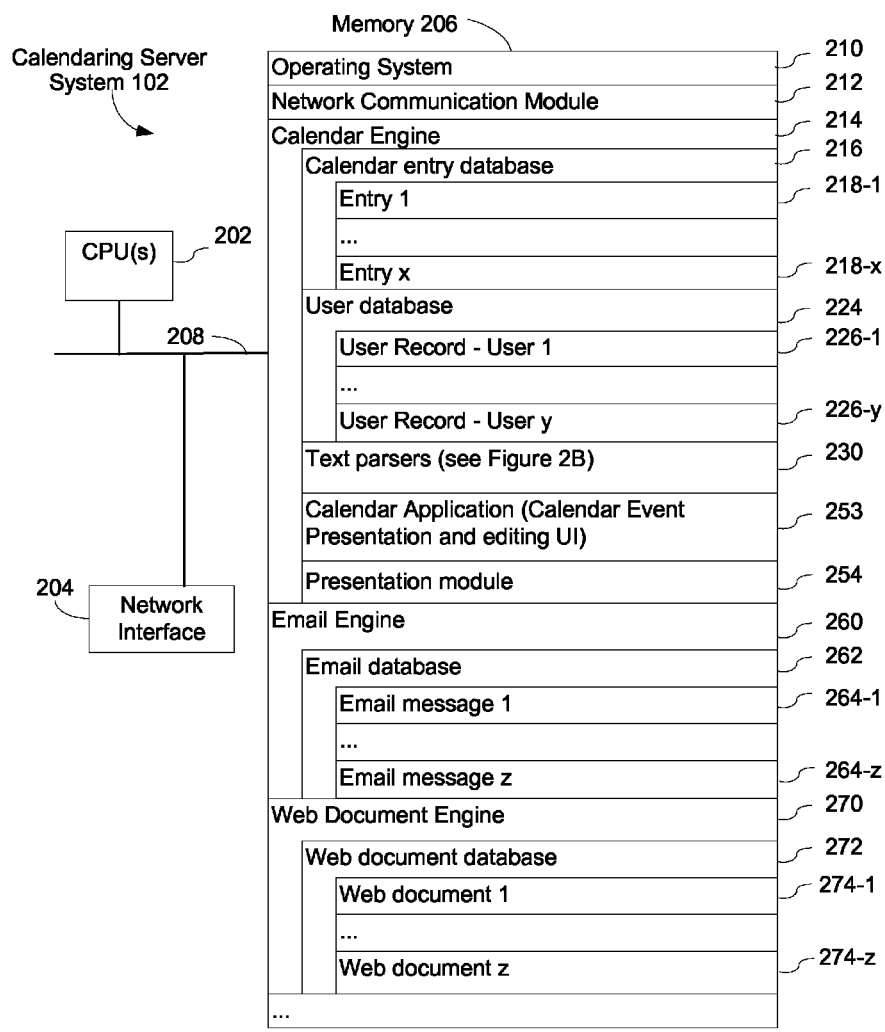
FIGS. 2A and 2B are block diagrams illustrating a server system in accordance with some embodiments.

FIG. 2A is a block diagram illustrating calendaring server system 102 in accordance with some embodiments. Calendaring server system 102 typically includes one or more processing units (CPUs) 202, one or more network or other communications interfaces 204, memory 206, and one or more communication buses 208 for interconnecting these components. The communication buses 208 may include circuitry (sometimes called a chipset) that interconnects and controls communications between system components. Calendaring server system 102 may optionally include a graphical user interface (not shown), which typically includes a display device, a keyboard, a mouse or other pointing device and a touch sensitive display screen. Memory 206 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally further includes one or more storage devices remotely located from the CPU(s) 202. Memory 206, or alternately the non-volatile memory device(s) within memory 206, comprises a non-transitory computer readable storage medium. In some embodiments, memory 206 or the computer readable storage medium of memory 206 stores the following programs, modules and data structures, or a subset thereof:

- Operating System 210 that includes procedures for handling various basic system services and for performing hardware dependent tasks;
- Network Communication Module (or instructions) 212 that is used for connecting calendaring server system 102 to other computers (e.g., clients 104 and other servers 110) via the one or more communications Network Interfaces 204 (wired or wireless) and one or more communications networks 106 (FIG. 1), such as the Internet, other wide area networks, local area networks, metropolitan area networks, and so on;
- Calendar Engine 214 that processes web documents (such as web based email documents) to provide embedded event creation link(s) and which also receives calendar-related requests from and provides responses to clients 104;
- Email Engine 260 that receives email for users from other email servers (e.g., 110), sends email from users to other email servers (e.g., 110), and receives email-related requests from and provides responses to clients 104; and
- Web Document Engine 270 that receives web documents from other servers (e.g., 110), and provides web documents with embedded event creation links to clients 104.

In some embodiments, the Calendar Engine 214 includes the following programs, modules and data structures, or a subset or superset thereof:

- Calendar entry database 216 that stores records 218 for calendar entries (e.g., records 218-1 through 218-x for Entries 1 through x, respectively);
- User database 224 that stores records 226 for users (e.g., records 226-1 through 226-y for Users 1 through y, respectively); and
- Text parsers 230 that extract information for use in various calendar fields from the email messages (264-1 to 264-z) or other web documents (274-1 to 274-z);
- Calendar Application 253, which provides to a requesting client a web page that presents a requested calendar event and provides a user interface for editing the calendar event, with the full event editing capabilities of calendar engine 214; and
- Presentation module 254 that formats the results from Calendar Engine 214 and Email Engine 260 or Web Document Engine 270 for display. The Presentation module 254 provides the email or web document for display with one or more embedded event creation links each corresponding to a distinct text portion of the web document associated with a respective parameter for the event (including embedded instructions to change a visual appearance of the distinct text portion of the web document corresponding to a respective event creation link in the web document, without activating the respective event creation link, in response to a predefined user action) and invokes display of an editable electronic calendar entry form with multiple fields containing event information from the event creation link in response to activation of an event creation link.

Figure 2B:
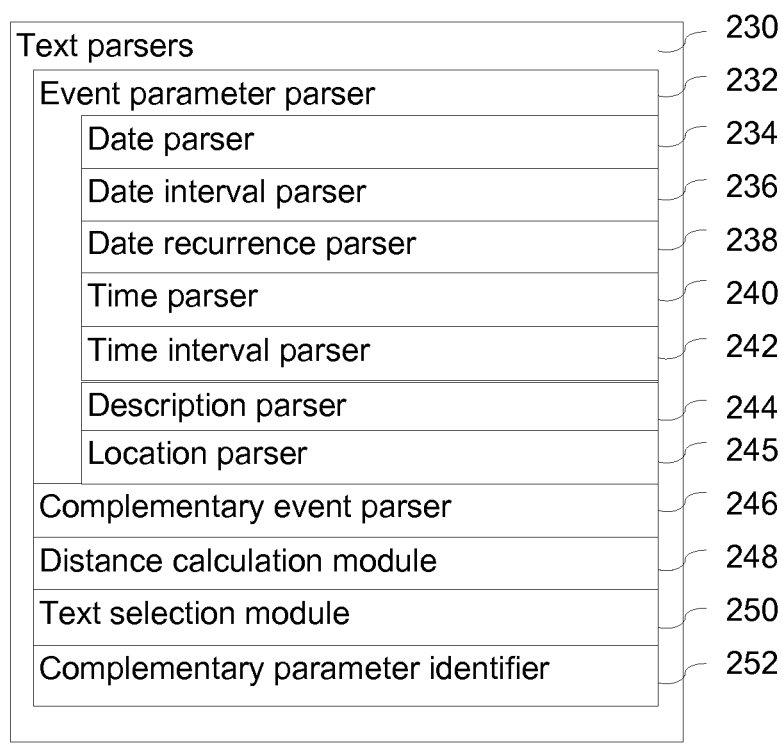

In some embodiments, Text parsers 230 are implemented on a server system other than the Calendar server system 102. For instance, in some embodiments, Text parsers 230 are implemented on an email server system (e.g., 110) that stores and provides access to email messages. In some other embodiments, Text parsers 230 are implemented in a client system browser, for example to parse text in web documents. In some embodiments, as shown in FIG. 2B, Text parsers 230 include the following programs, modules and data structures, or a subset or superset thereof:

- Event parameter parser 232 for identifying a first parameter of an event (such as Date parser 234 that extracts the date and a Time parser 240 that extracts start times and/or end times);
- Complementary event parser 246 for identifying parameters which are complementary to the first parameter and which potentially correspond to the event (for example, by identifying second and third text portions of the web document having a parameter type, such as time of day, that complements a parameter type, such as date, of the first parameter);
- Distance calculation module 248 for determining a first distance metric for the second text portion, corresponding to a textual distance between the first text portion and the second text portion, and a second distance metric for the third text portion, corresponding to a textual distance between the first text portion and the third text portion;
- Text selection module 250 for selecting a text portion from among the second text portion and the third text portion in accordance with the first distance metric (for the second text portion) and the second distance metric (for the third text portion); and
- Complementary parameter identification module 252 for identifying the parameter described by the selected text portion.

In some embodiments, the Event Parameter parser 232 optionally also includes one or more additional temporal parsers of:

- Date interval parser 236 extracts anchored periods of time;
- Date recurrence parser 238 that extracts repeated or cyclical temporal expressions (e.g., "Monday and Tuesday" and "Every other Monday");
- Time interval parser 242 that extracts the length of time of an event;
- Description parser 244 that extracts event titles and/or descriptions for the Subject of the Extracted event, "meeting" or "picnic" or "ABC Flight 3412," obtained in some embodiments from the subject of an email;
- Event location parser 245 that extracts event locations for the Extracted event.

In some embodiments, the temporal parsers 234, 236, 238, 240, and 242 are combined into a single temporal expression parser. Temporal parsing is described below. The other types of parsing are performed in an analogous manner.

In some embodiments, temporal expression parsing has three logical steps: (1) recognition, also known as syntactic parsing; (2) decoding, or semantic analysis; and (3) abductive inference, or resolution of ambiguous and/or underspecified expressions. The input data for parsing is a text string, which may include zero, one, or more temporal expressions, and the output information is a temporal expression representation that may include partial or complete date/times, date/time intervals (which include begin and end points), and/or recurrences (e.g., carrying the meaning of "every Wednesday").

In some embodiments, recognition is accomplished using a regular expression matching engine and a grammar that provides tags for the matches. For example, the expression "9/18/05" can produce matches for MONTH "9", DAY "18" and YEAR "05". In some embodiments, to interpret this text in European format, day/month/year, a different grammar is used, with the grammar selection controlled through meta information passed in with each parser invocation.

In some embodiments, decoding consists of translating the matching strings into a temporal expression representation using the tags to guide the decoding and assignment. In some embodiments, the strings are converted into numbers and assigned to a single date expression with month, year, and day fields. Heuristic rules may be applied, e.g., to interpret "05" as the year 2005. Indexical expressions, e.g., "today", and relative expressions, e.g., "next Wednesday and the Thursday following" are also interpreted at this stage, using date/time reference information passed in as part of the parser invocation.

In some embodiments, abductive inference rules are used to add information and/or apply constraints to the decoded expression. For example, "9/18" would be interpreted as a month and day in the current year; hour and time zone would be left unspecified. Abductive inference is used to infer AM/PM when this information is not in the text string, e.g., "from 11 to 9" is interpreted as 11 AM to 9 PM, on a single day. In some embodiments, this stage also handles resolution of temporal expressions that are not contiguous. For example, a date could appear at one place in the text, and a time or time range elsewhere: "lecture this Friday in Tammany Hall, from 11 to 12." This text is resolved to a single interval expression, where the begin date and end date correspond to the coming Friday, the begin time is 11 AM and the end time is 12 noon.

Email Engine 260 may include the following programs, modules and data structures, or a subset or superset thereof:
  Email database 262 that stores records for email messages for users (e.g., records 264-through 264-z for email messages 1 through z, respectively).

Web Document Engine 270 may include the following programs, modules and data structures, or a subset or superset thereof:
  Web Document database 272 that stores records for web documents (e.g., records 274-through 274-z for web documents 1 through z, respectively).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIGS. 2A-2B show calendaring server system 102 as a number of discrete items, FIGS. 2A-2B are intended more as a functional description of the various features which may be present in server 102 rather than as a structural schematic of the embodiments described herein. In practice, and as recognized by those of ordinary skill in the art, items shown separately could be combined and some items could be separated. For example, some items shown separately in FIGS. 2A-2B could be implemented on single servers and single items could be implemented by one or more servers. The actual number of servers in calendaring server system 102 and how features are allocated among them will vary from one implementation to another, and may depend in part on the amount of data traffic that the system must handle during peak usage periods as well as during average usage periods.

Figures 3A, 3B:
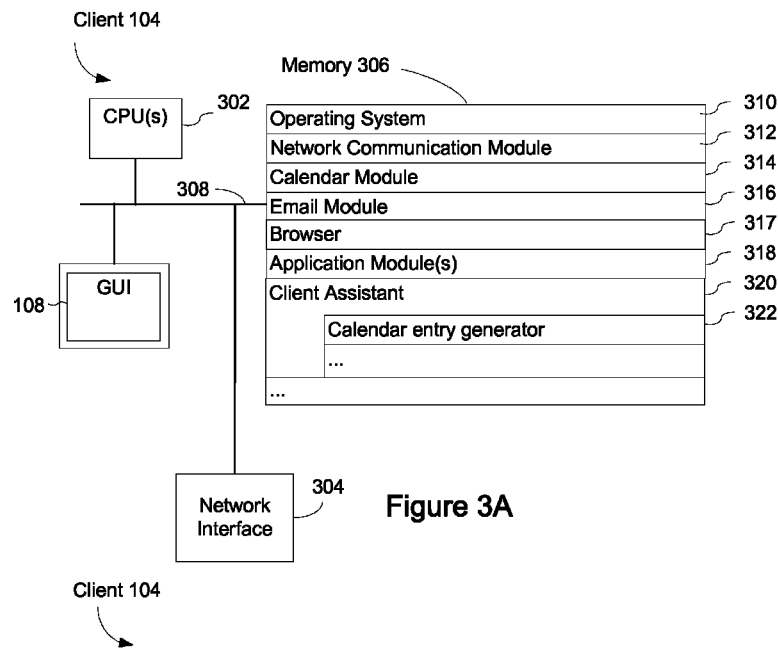
FIGS. 3A and 3B are block diagrams illustrating two exemplary clients in accordance with some embodiments.

FIGS. 3A and 3B are block diagrams illustrating two exemplary clients. As noted above, client 104 includes graphical user interface (GUI) 108, which typically includes a display device, a keyboard, and a mouse or other pointing device or touch sensitive surface for activating an event creation link and for performing a non-activating user action (e.g., mouse hovering). Client 104 typically includes one or more processing units (CPUs) 302, one or more network or other communications interfaces 304, memory 306, and one or more communication buses 308 for interconnecting these components. The communication buses 308 may include circuitry (sometimes called a chipset) that interconnects and controls communications between system components.

Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally further includes one or more storage devices remotely located from the CPU(s) 302 (e.g., cloud storage). Memory 306, or alternately the non-volatile memory device(s) within memory 306, comprises a non-transitory computer readable storage medium. In some embodiments, memory 306 or the computer readable storage medium of memory 306 stores the following programs, modules and data structures, or a subset or superset thereof:
  Operating System 310 that includes procedures for handling various basic system services and for performing hardware dependent tasks;
  Network Communication Module (or instructions) 312 that is used for connecting client 104 to other computers (e.g., calendaring server system 102 and other clients 104) via the one or more communications Network Interfaces 304 (wired or wireless) and one or more communication networks 106 (FIG. 1), such as the Internet, other wide area networks, local area networks, metropolitan area networks, and so on;
  Calendar Module 314, for receiving calendar-related input from a computer user (e.g., a request to create an electronic calendar entry and an email message for parsing) and for formatting the calendar data for display in GUI 108.
  Email Module 316, for receiving email-related input from a computer user (e.g., requests to create, send and view emails) and for formatting the emails for display in GUI 108;
  Internet or web browser 317 for formatting and displaying web documents in GUI 108;

Application Module(s) 318 for other applications (e.g., an Internet or web browser); and Client Assistant 320, which handles data formatting and/or management tasks, at least some of which could also be handled by Calendar Engine 214 and/or Email Engine 260 or Web Document Engine 270 (FIG. 2A, calendaring server system 102).

As illustrated schematically in FIG. 3A, client 104 can incorporate modules, applications, and instructions for performing a variety of calendar-related processing tasks (e.g., calendar-entry generator 322), at least some of which could be handled by Calendar Engine 214 in server 102 instead. Alternatively, in some embodiments, client 104 can contain less functionality than shown in FIG. 3A. For instance, as shown in FIG. 3B, client 104 may be a "thin client" that includes an Internet or web browser 317, but does not include email or calendar modules other than any execution code (e.g., programs or other executable instructions) that may be embedded in pages rendered by the web browser 317, such as email pages 324, web document pages 326, calendar entry form pages 328, and calendar pages 330. In such embodiments, Calendar Module 314 and Email Module 316 are implemented as code embedded in web pages and are executed by (or "inside") browser 317. In thin client embodiments, essentially all email and calendar related processing other than user data input and email and calendar display are handled by an email server system (e.g., 110) and calendaring server system 102.

Figure 4:
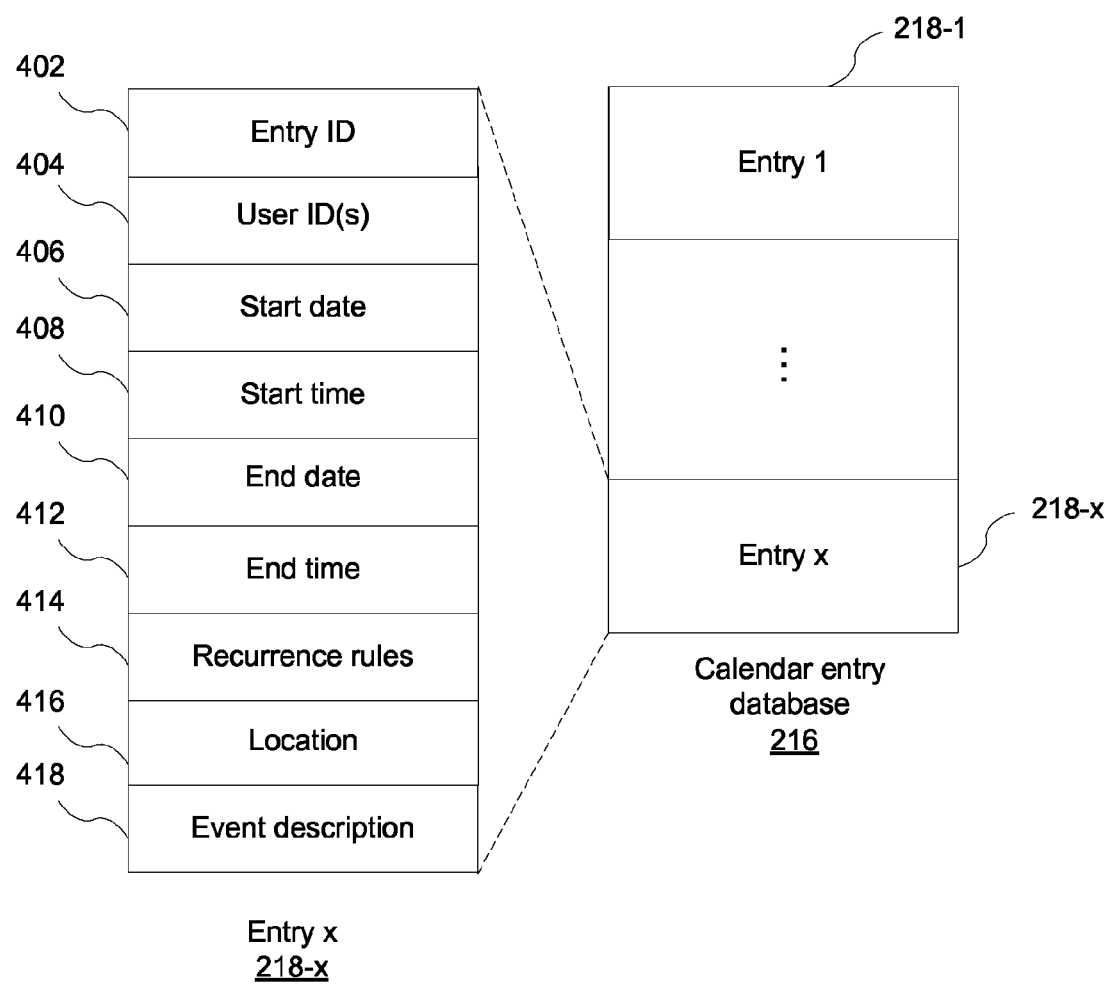
FIG. 4 is a block diagram illustrating an exemplary calendar entry database and an exemplary calendar entry record in accordance with some embodiments.

FIG. 4 is a block diagram illustrating an exemplary calendar entry database 216 and an exemplary calendar entry record 218 in accordance with one embodiment of the invention. Calendar entry database 216 stores calendar entry records 218, for example entry 1 (218-1) through entry x (218-x), where x may represent the number of entries.

A calendar entry (e.g., entry x 218-x) may include the following data, or a subset or superset thereof:
  Entry ID 402 that uniquely identifies a particular entry (e.g., an n-bit binary number);
  User ID(s) 404 that identifies the user(s) associated with the calendar entry (e.g., n-bit binary number(s) or e-mail addresses), such as an event organizer and attendees/guests/participants;
  Start date 406 of the event;
  Start time 408 of the event;
  End date 410 of the event;
  End time 412 of the event;
  Recurrence rules 414 for the event (e.g., only once, daily, weekly, every other week, etc.);
  Location 416 of the event; and
  Event description 418 (e.g., a title and/or description details).

In another embodiment, a separate calendar entry database is maintained for each user. In some embodiments, a calendar entry may further include a link to an email message or web document from which the event was created. For example, when a calendar entry is generated based on information in an email message, the resulting calendar entry may include a link to the email message. In addition, in some embodiments, the email message may contain a link to the calendar entry that was generated based on information in the email message.

Figure 5A:
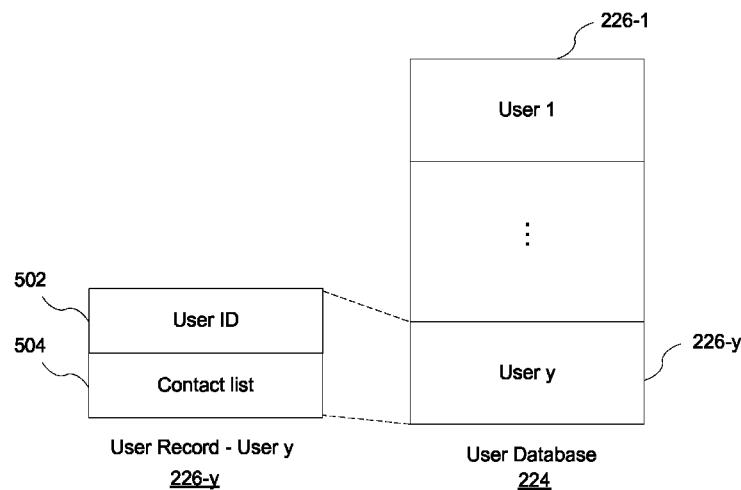
FIG. 5A is a block diagram illustrating an exemplary user database and an exemplary record for a particular user in accordance with some embodiments.

FIG. 5A is a block diagram illustrating an exemplary user database 224 and an exemplary user record 226-y for a particular user in accordance with one embodiment of the invention. User Database 224 stores user records 226, for example user record (User 1) 226-1 through user record (User y) 226-y, where y may represent the number of users.

A user record (e.g., User Record 226-y) may include the following data, or a subset or superset thereof:
  User ID 502 that uniquely identifies a particular user (e.g., an n-bit binary number or an email address); and
  Contact list 504, which contains contact information for the user (i.e., information about other users or persons known to the user); alternatively, this field 504 of the user record 226 may contain a link to the user's contact list.

In embodiments in which the calendar server maintains a separate calendar entry database for each user, the user record 226 may include a pointer or link to the calendar entry database for that user.

Figure 5B:
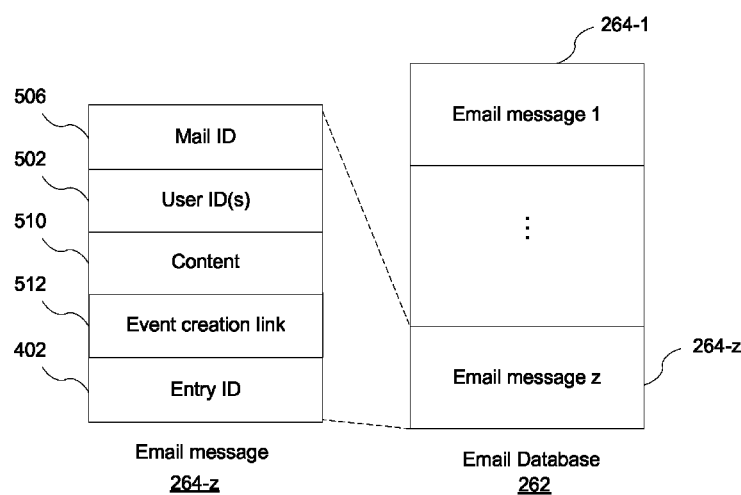
FIG. 5B is a block diagram illustrating an exemplary email database and an exemplary email message in accordance with some embodiments.

FIG. 5B is a block diagram illustrating an exemplary email database 262 and an exemplary email message 264-z in accordance with one embodiment of the invention. Email database 262 stores email messages 264, for example message 264-1 (email message 1) through message 264-z (email message z), where z may represent the number of messages.

An email message (e.g., message 264-z) may include the following data, or a subset or superset thereof:
  Mail ID 506 that uniquely identifies a particular message (e.g., an n-bit binary number);
  User ID(s) 502 that uniquely identify particular users that the message is being sent to (e.g., n-bit binary numbers or email addresses);
  Content 510 (e.g., text and images);
  Embedded event creation link 512 that contains event information (if any) corresponding to at least some of the parameters determined for an event described in the email message; and
  Entry ID 402 for a corresponding calendar entry, if any.

Entry ID 402 is null or empty if there is not a calendar entry that corresponds to the email message. Similarly, embedded event creation link 512 is null or empty if no event information is identified in the email message by the text parsers 230. In some embodiments, the event parameters are determined just after the user requests the corresponding email message 264 (i.e., the event parameters are determined "on the fly" in response to the user's request for the corresponding email message) and the embedded even creation link 512 is not stored in the corresponding email message 264 in email database 262 before the message is sent to the client.

Figure 6A:
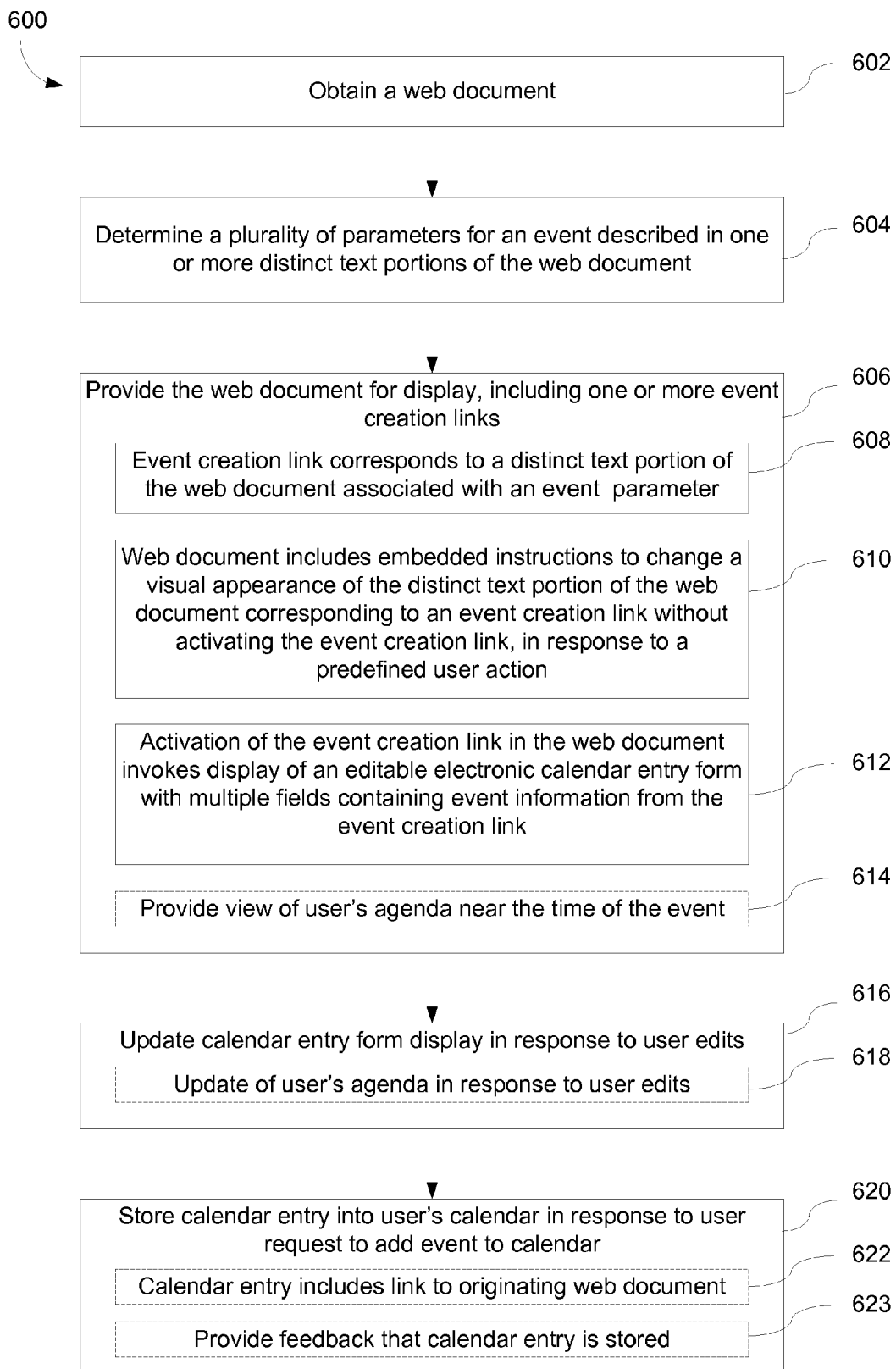
FIGS. 6A and 6B are flowcharts representing method(s) of creating electronic calendar entries from web documents in accordance with some embodiments.
Figure 6B:
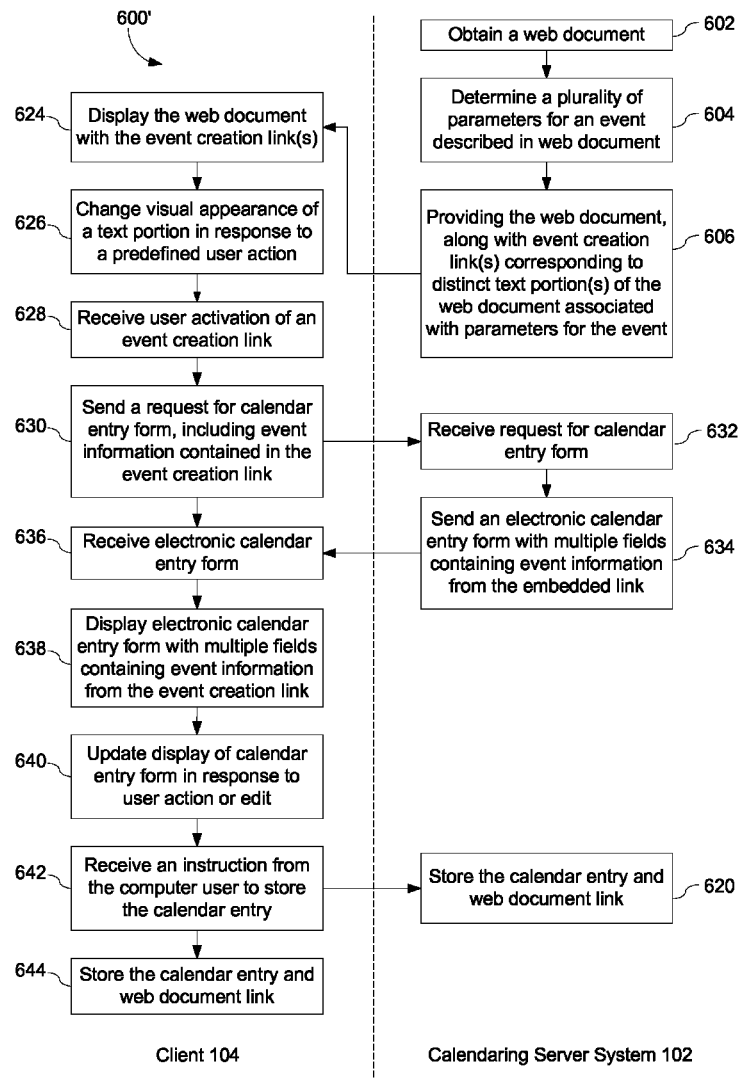

FIGS. 6A and 6B are flowcharts representing a method 600 of creating electronic calendar entries from web documents in accordance with some embodiments. The method 600 is typically governed by instructions that are stored in a computer readable storage medium and that are executed by one or more processors of one or more servers. Each of the operations shown in FIGS. 6A and 6B typically corresponds to instructions stored in a computer memory or non-transitory computer readable storage medium. The computer readable storage medium typically includes a magnetic or optical disk storage device, solid state storage devices such as Flash memory, or other non-volatile memory device or devices. The computer readable instructions stored on the computer readable storage medium are in source code, assembly language code, object code, byte code, or other instruction format that is interpreted by one or more processors. Specifically, many of the operations shown in FIG. 6A correspond to instructions in text parsers 230 and presentation module 254 of calendaring server system 102 shown in FIG. 2A. Similarly, specifically many of the operations shown in FIG. 6B correspond to instructions in browser 317 and/or calendar module 314, email module 316, and client assistant 320 of the clients shown in FIGS. 3A and 3B, and also text parsers 230 and presentation module 254 of calendaring server system 102 shown in FIG. 2A. However, it will be appreciated by those of ordinary skill in the art that one or more of the acts described may be performed by hardware, software, or a combination thereof, as may be embodied in one or more computing systems. For instance, in some embodiments, portions of the processes performed by server 102 can be performed by client 104 using components analogous to those shown for server 102 in FIG. 2A.

In method 600, a web document is obtained (602). In some embodiments, the web document is an email document. In other embodiments, the web document is a web page of a website, while in yet other embodiments the web document is an XML document, HTML document or other document that can be rendered by a browser.

A plurality of parameters for an event described in one or more distinct text portions of the web document is determined (604). The determination of parameters may be performed by the method described in more detail with respect to FIGS. 8A and 8B. The determination of the parameters may also be performed in accordance with the method(s) described in U.S. patent application Ser. No. 13/761,021 filed on Feb. 6, 2013, incorporated by reference in its entirety.

In some embodiments, the server 102 determines (604) (e.g., using text parsers 230) a plurality of parameters for an event described in the web document. In some embodiments, text parsers 230 identify or infer information for multiple fields in electronic calendar entry form. Examples of inferred information (values) include, without limitation: inferring absolute dates and times based on relative dates and times (e.g., inferring tomorrow's date if the when information is "tomorrow"); inferring that a "birthday" lasts all day; and inferring from metadata in an email message that indicates that the message was created on Apr. 1, 2013 that "today" means Apr. 1, 2013, even if the message is being viewed at a later date. Thus, for an email message "lunch with fred at 1 tomorrow", "1" is inferred to be 1 PM in the local time zone and "tomorrow" is translated into the date of the following day.

In some embodiments, the determined parameters for an event described in one or more distinct text portions (604) of the web document include only a date and a time. In other embodiments, the parameters include at least two or more of: a date, a time, a location, a subject, and one or more attendees of the event.

As another example, consider the following exemplary email message, sent on Friday, Mar. 3, 2013:

"Subject: Pizza

John,

Would you like to go out for dinner next Tuesday at 7 PM with Mike and Steve?

—Jane"

For this message, the parameters determined by the text parsers 230 potentially include the following (or a subset of the following):

Start date: Mar. 7, 2013
Start time: 7:00 PM
End date: unspecified
End time: unspecified
Recurrence rules: Does not repeat
Location: unspecified
Title: Pizza The server creates an event creation link, which contains event information corresponding to at least some of the determined parameters for the event. In some embodiments, the determined parameters contained in the event creation include at least one date or time parameter and at least one parameter other than a date or time parameter of the event such as the title. In some embodiments, if a time parameter is not found, the calendar event is considered to be an all day event.

For the exemplary email message given above, the embedded event creation link may be:

http://www.abc.com/calendar/
event?action=TEMPLATE&pprop=mailID:xxx
xxxxxxx&dates=20130307T190000/
????????T??????&text=Pizza where:

"www.abc.com/calendar" corresponds to the server 102 at abc.com that will send the editable calendar entry form to client 104 in response to activation of the link;

"xxxxxxxxxx" is a unique identifier (mail ID) for the corresponding email message;

"20130307" is event information (e.g., in YearMMDD format) corresponding to the start date parameter determined by date parser 234, which will be formatted and displayed in start date field in calendar entry form;

"190000" is event information (e.g., in 24-hour HHMMSS format) corresponding to the start time parameter determined by time parser 240, which will be formatted and displayed in start time field in calendar entry form;

"????????T??????" is unspecified event information corresponding to the end date and time parameters left undetermined by date parser 234 and time parser 240, respectively; and "Pizza" is event information corresponding to the title parameters determined by description parser 244, which will be formatted and displayed in title field in calendar entry form.

In some embodiments, the event creation link is a link that launches a script (e.g., a Javascript script, VBScript, Go script, Python script, etc.), with embedded parameters, when the link is activated by a user.

Stated more generally, the web document is provided for display, including one or more event creation links (606). In some embodiments, the web document is provided for display to a computer associated with a user. The event creation link contains event information corresponding to at least some of the determined parameters for the event. In some embodiments, the parameters include the date and/or time of the event. In some embodiments, if no time is specified the event is set to be an all day event. In some embodiments, the parameters also include a subject or title of the event. In some embodiments, where the web document is an email message, the subject or title parameter is the subject or title of the email. In some embodiments, where the web document is an email message, the date and/or time of the event are derived from text in the email message's subject field.

Figure 7A:
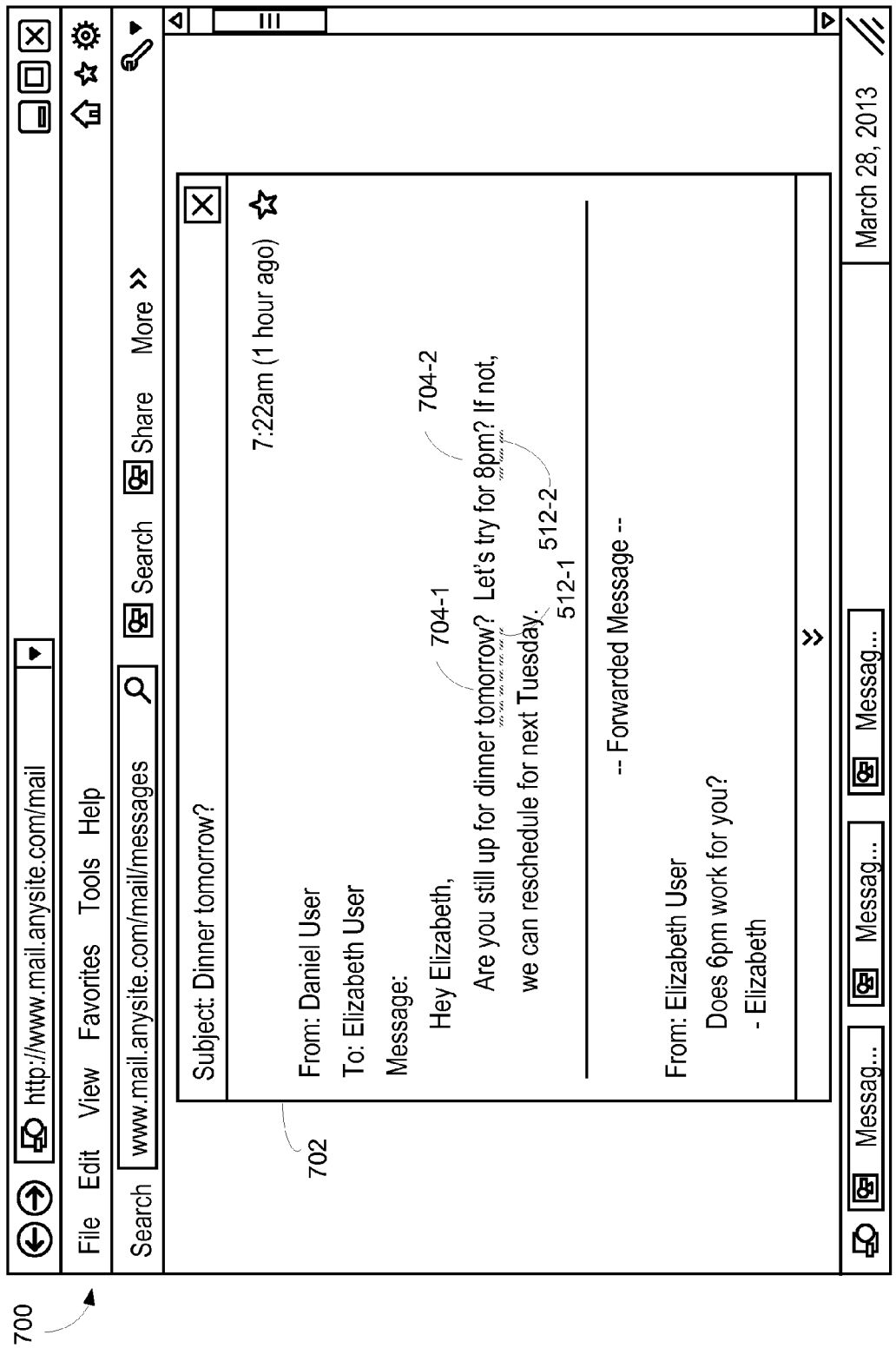

Each event creation link corresponds to a distinct text portion of the web document associated with a respective parameter for the event (608). In some embodiments, the web document is provided for display with the respective distinct text portions lightly underlined or otherwise visually distinguished from remaining text, as shown in FIG. 7A. In most embodiments, the distinct text portions include the date or the time of the event. In some embodiments, when the date and time appear near each other, e.g., within one word of each other, the date and time and the text in-between are treated as a single distinct text portion. For example, as shown in FIG. 7I, the distinct text portion "April 11 at 8 pm" is all lightly underlined together.

Figure 7B:
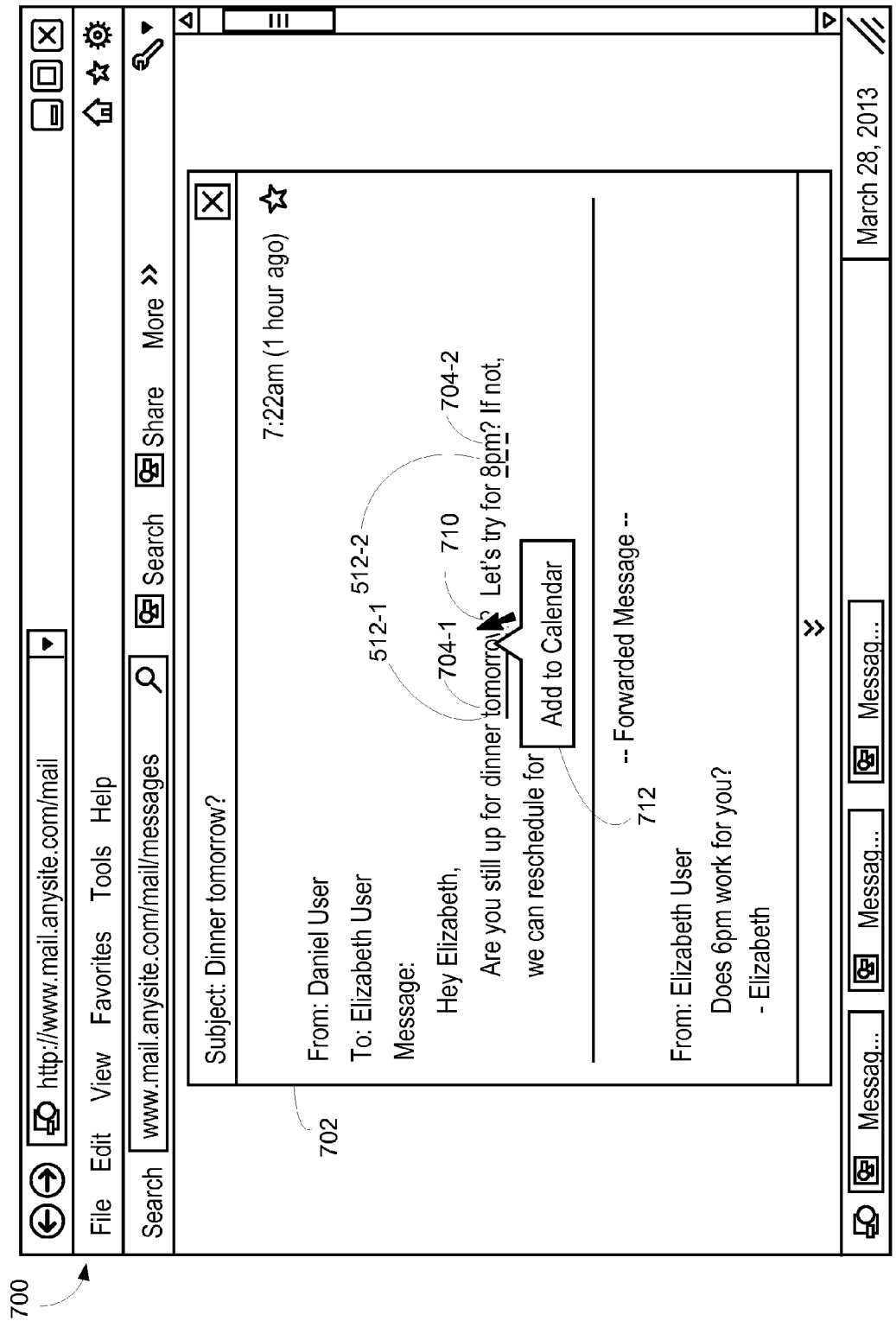

The web document further includes embedded instructions to change a visual appearance of the distinct text portion of the web document corresponding to a respective event creation link in the web document, without activating the respective event creation link, in response to a predefined user action (610). For example, in some embodiments, when a user-controlled pointer hovers over the distinct text portion (e.g., the lightly underlined date and/or time), its appearance changes to a traditional hyperlink display such as dark grey text with solid underlining. FIG. 7B illustrates a user mouse hover action causing a visual appearance of the distinct text portion 704-1 of the web document corresponding to a respective event creation link to change from the light dashed line underlining of FIG. 7A to the solid line underlining of 7B. Furthermore, in some embodiments, the web document further includes embedded instructions to provide an instructional pop-up near the distinct text portion corresponding to a respective event creation link in the web document, without activating the respective event creation link, in response to a predefined user action. For example, in FIG. 7B the instructional pop-up indicates "add to calendar."

Figure 7C:
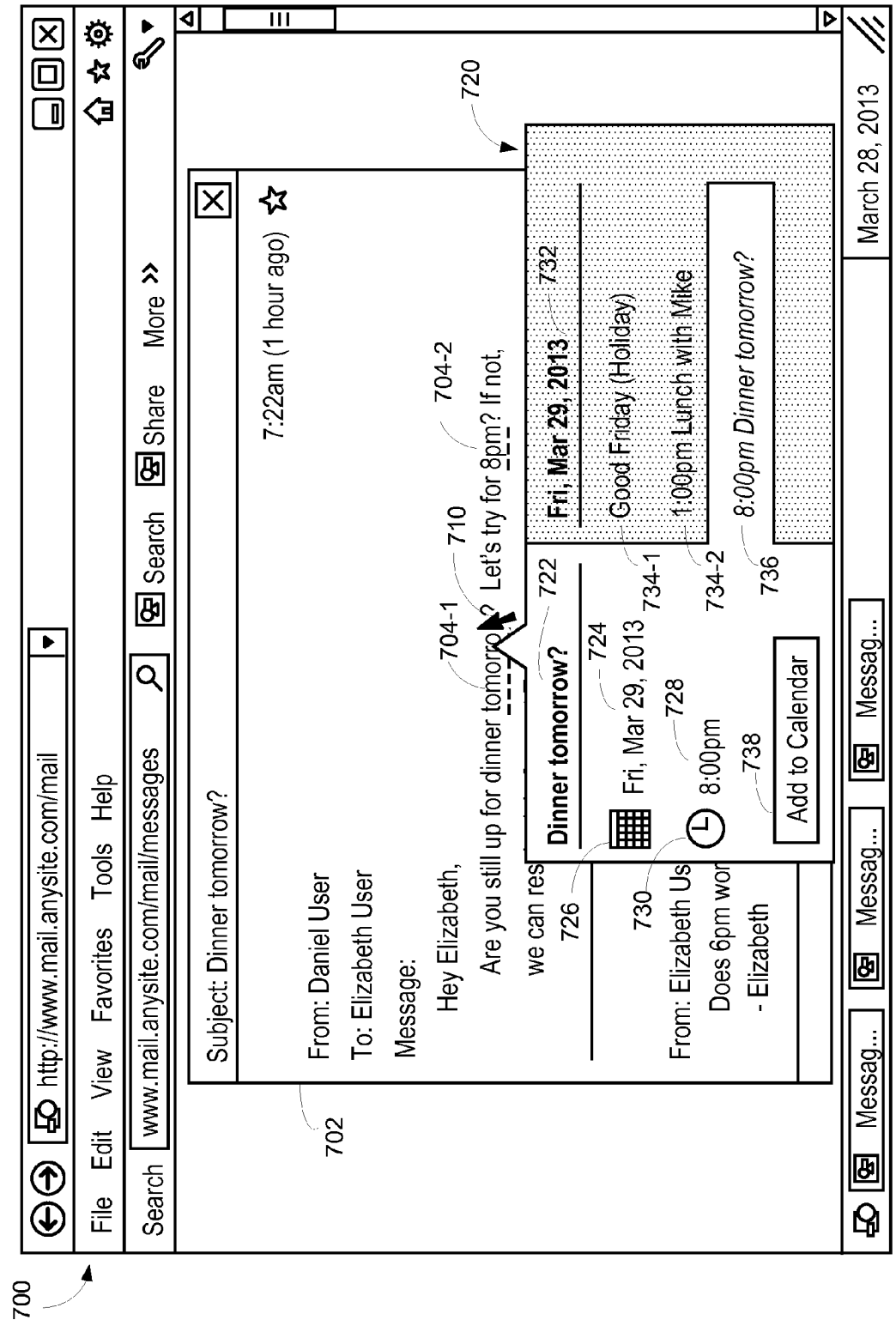

Activation of the event creation link in the web document invokes display of an editable electronic calendar entry form with multiple fields containing event information from the event creation link (612). User activation includes a user clicking or otherwise selecting the event creation link. For example, in some embodiments, the user can click anywhere on the date or time to invoke the corresponding event creation link. An exemplary editable electronic calendar entry form is illustrated in FIG. 7C. In some embodiments, however, an editable electronic calendar entry form is displayed in response to the predefined user action (e.g., hovering a user-controller pointer or focus selector) over the distinct text portion, without requiring a user click or the like.

In some embodiments, a view of the user's agenda near the time of the event is also provided for concurrent display with the editable electronic calendar entry form (614). An exemplary editable electronic calendar entry form displayed concurrently with a portion of a user's agenda near the time of the event is illustrated in FIG. 7C.

Figure 7D:
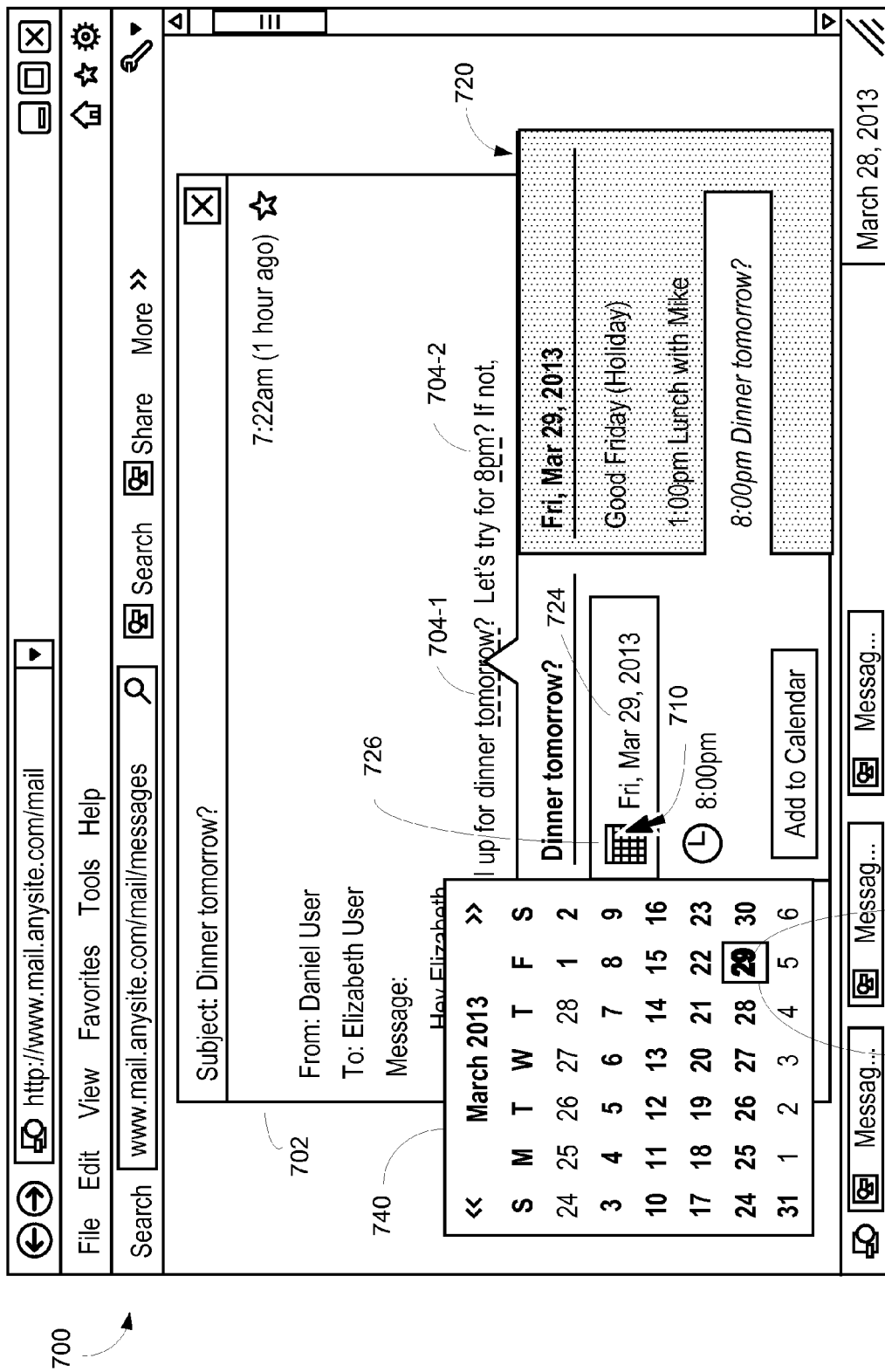
Figure 7E:
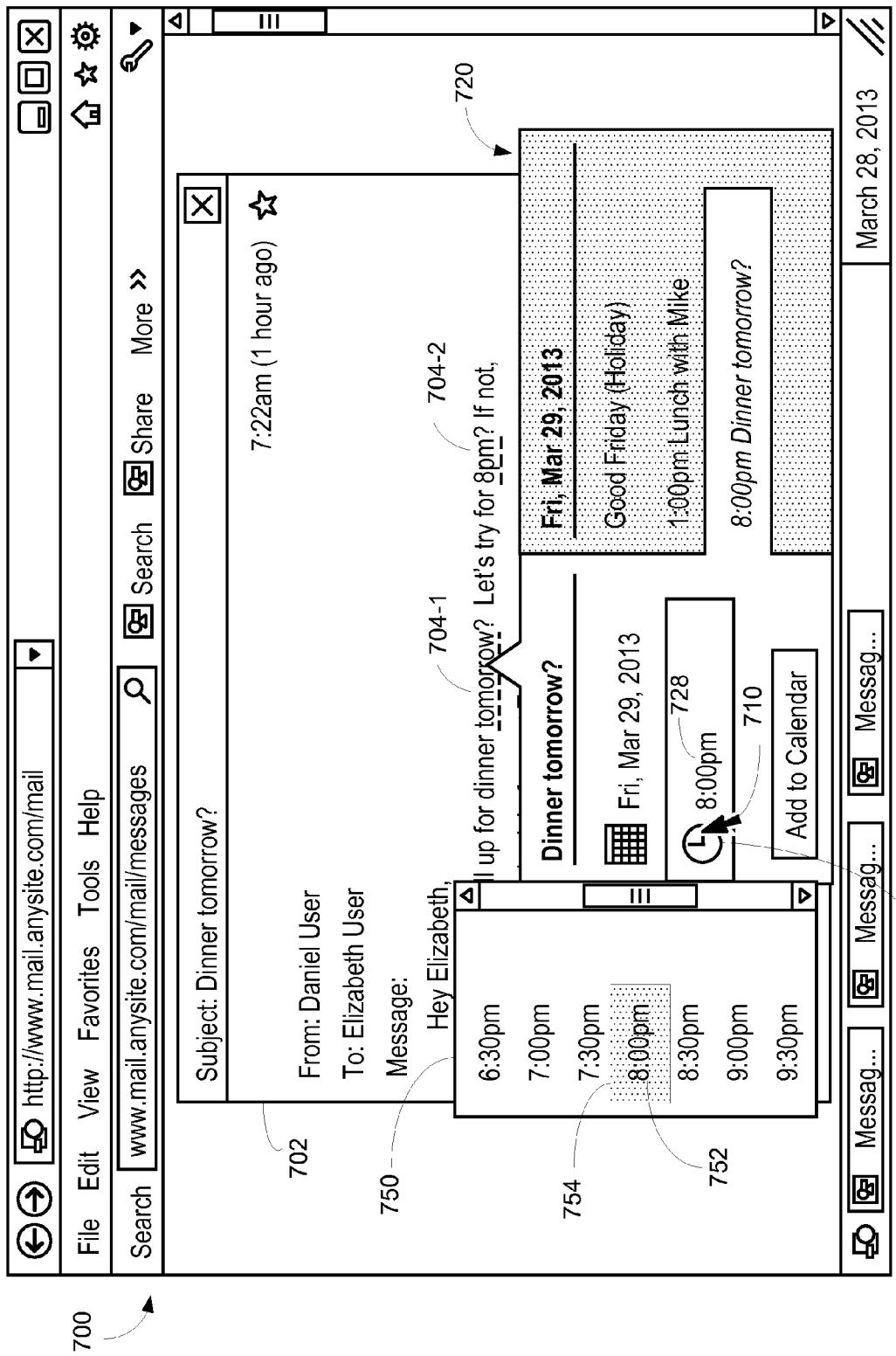

Edits or updates made by the user invoke an update of the calendar entry form (616). For instance user selection of a date change icon, e.g., a calendar icon, which is displayed within the editable electronic calendar entry form enables the user to perform a predefined date change action in response to a predefined date change user action. For example, FIG. 7D illustrates a user mouse hover action over a calendar icon, which causes a date change affordance 740 (e.g., an interactive calendar pop-up) to appear. Similarly, a time change affordance is displayed within the editable electronic calendar entry form in response to a predefined time change user action. For example, FIG. 7E illustrates a user mouse hover action over a clock icon, which causes an interactive time selection pop-up to appear.

Figure 7F:
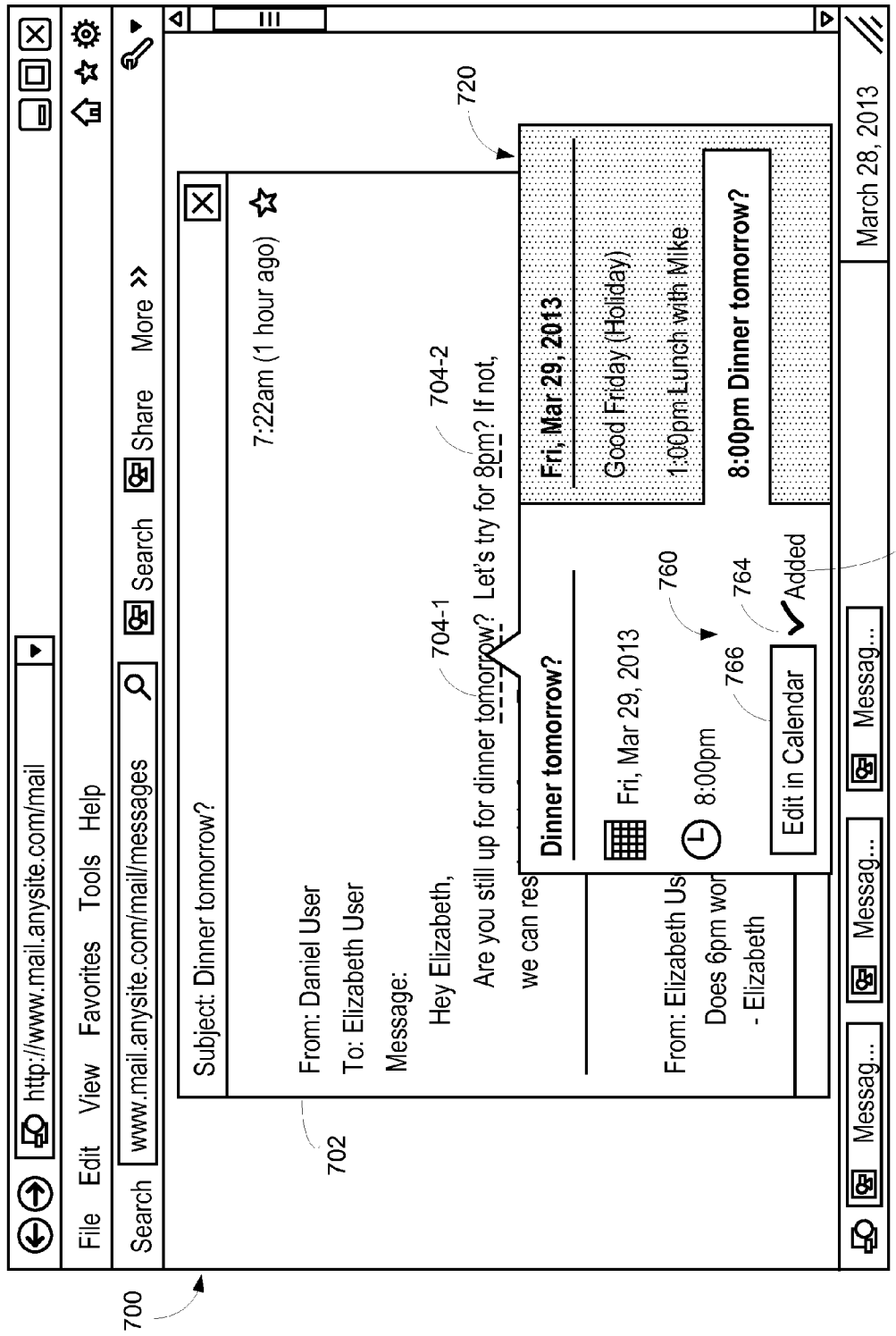
Figure 7H:
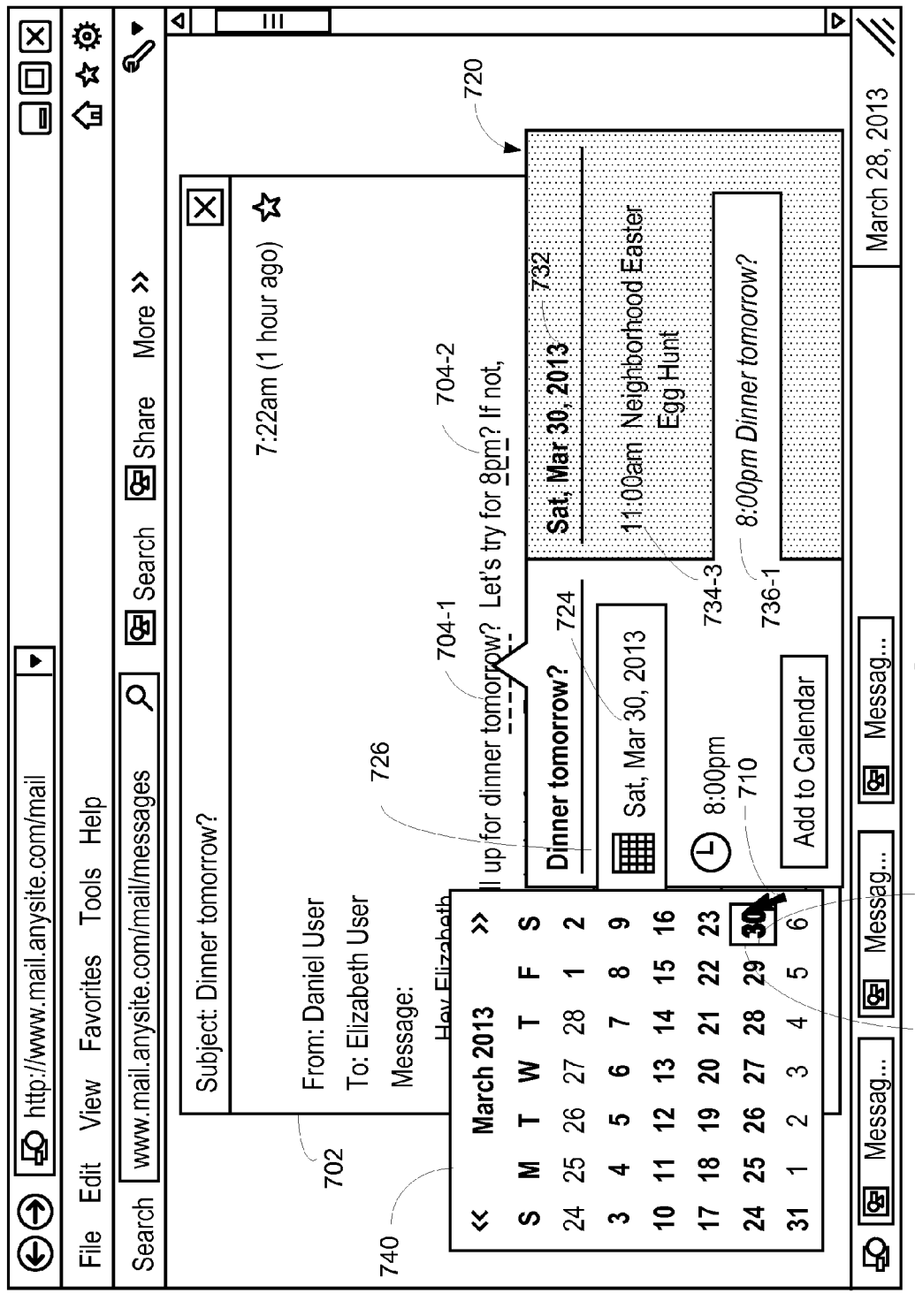
Figure 7I:
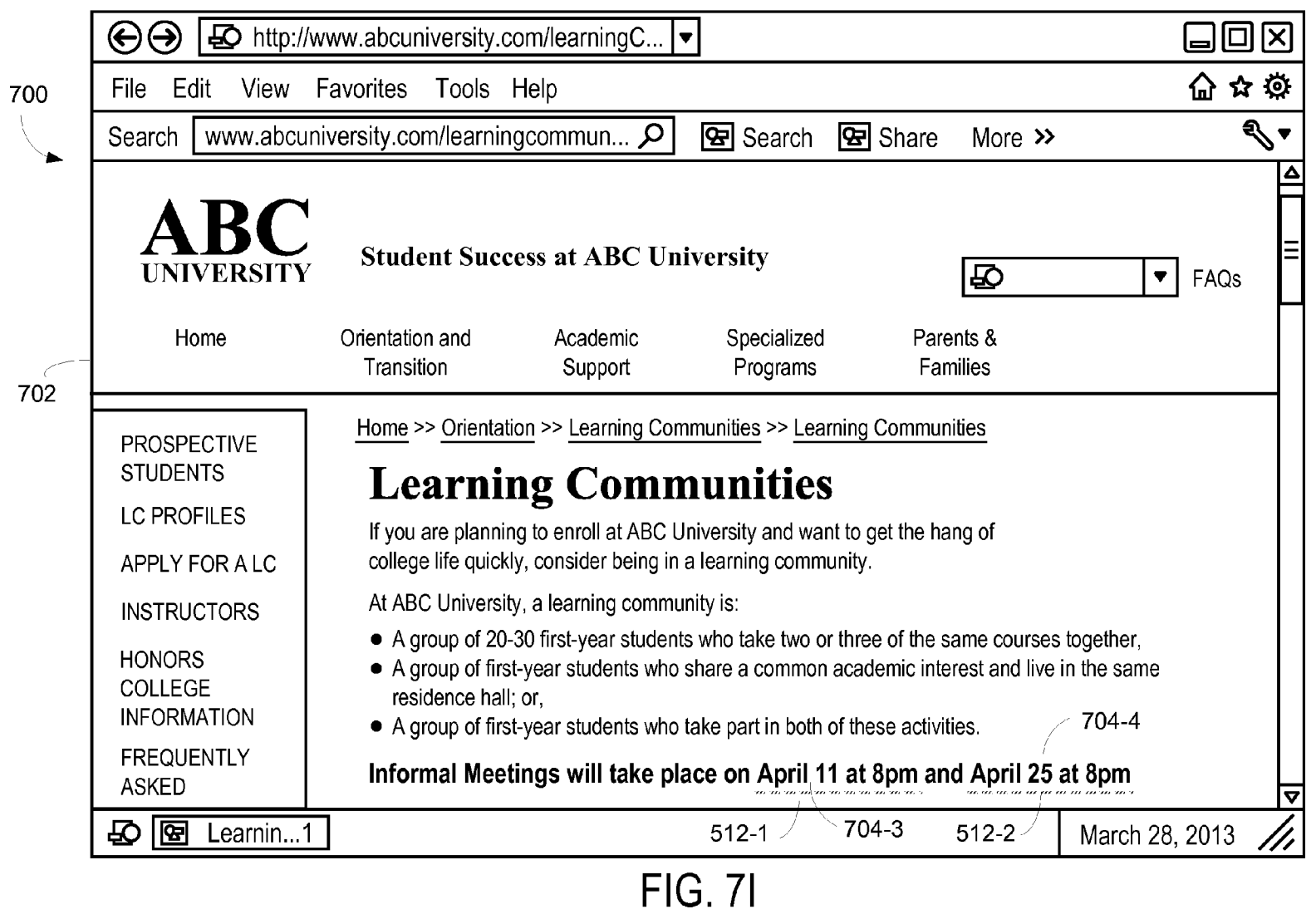

Furthermore, in some embodiments, an update to the date or time of the event invokes an updated display of the user's agenda for a date, or range or times, corresponding to the date and/or time of the event (618). For example, FIG. 7H illustrates a user action to change a date from "Fri, Mar. 29, 2013" as shown in FIG. 7D, to "Sat, Mar. 30, 2013" causes the display of the user's agenda to update from the events of "Fri, Mar. 29, 2013 (e.g., "Lunch with Mike") to the events of Sat, Mar. 30, 2013 (e.g., "Neighborhood Easter Egg Hunt"). As shown in FIG. 7H, in some embodiments the updated calendar entry form and the updated display of the user's agenda are concurrently displayed. Furthermore, in some embodiments the updated calendar entry form and the updated display of the user's agenda are concurrently adjacent to each other.

In response to a user request to add the event to the user's calendar, the calendar entry is stored (620). In some embodiments, the editable calendar entry form further includes a calendar insertion link, such as the "add to calendar" button as shown, for example, in FIG. 7C. As such, the user's request to add the event to the user's calendar is accomplished by the user clicking or otherwise activating the "add to calendar" button.

In some embodiments, a link to the originating web document is also stored in the calendar entry (622). For example, the calendar entry and the link to the web document are stored in a calendar of a user in response to activation of the calendar insertion link.

In some embodiments, activation of the calendar insertion link also invokes a display of feedback (e.g., confirmation that the calendar entry is stored in the user's calendar) within the editable electronic calendar entry form (623). For example, FIG. 7F illustrates that user activation of the "add to calendar" button invokes a display of the feedback "added," display of a checkmark, and display of an "edit in calendar" button. In some embodiments, a "delete" option is also displayed so that a user can easily and immediately delete a calendar entry created accidentally.

In some embodiments, a user's activation of a calendar editing affordance invokes a display of a calendar event page (e.g., a web page on a calendar web site) or pop-out, where the user can make additional edits to the calendar event. For example, as shown in FIG. 7G if the user selects the displayed "edit in calendar" affordance shown in FIG. 7F, the calendar event pop-out is displayed, and the user has the option of making the event repeat, adding a location, changing which calendar the event belongs to, adding a description, changing the event color (e.g., a background color or border color shown when displaying the event in the user's calendar), adding reminders, changing the availability showings, and changing the privacy settings of the calendar event.

FIG. 6B also illustrates a method 600' of creating electronic calendar entries from web documents in accordance with some embodiments. Specifically, FIG. 6B illustrates an embodiment in which the client 104 and the server 106 perform the method 600' together. However, it will be appreciated by those of ordinary skill in the art that one or more of the acts described may be performed by hardware, software, or a combination thereof, as may be embodied in one or more computing systems. For instance, in some embodiments, portions of the method 600' performed by server 102 can be performed by client 104 using components analogous to those shown for server 102 in FIG. 2A.

As described in more detail with respect to FIG. 6A, a web document is obtained (602). A plurality of parameters for an event described in one or more distinct text portions of the web document is determined (604). The web document is provided, along with event creation link(s) corresponding to distinct text portion(s) of the web document associated with parameters for the event (606). In FIG. 6B, these operations are performed at the calendaring server system. In some embodiments, the event creation link 512 is stored after the event parameters are determined (604) and before the web document is sent to the client (606). For example, in some embodiments the event creation link 512 is stored in its corresponding email message 256 in email database 254. In some embodiments, the event parameters are determined (604) just after the user requests the web document (i.e., the event parameters are determined "on the fly" in response to the user's request for the corresponding web document).

The client receives the web document with the embedded event creation link(s) and displays the web document including one or more event creation links, each corresponding to a distinct text portion of the web document associated with a parameter for an event (624). Examples of displayed web documents that include one or more event creation links are illustrated in FIGS. 7A and 7I. Client 104 receives the web document with the embedded event creation link 512 (FIG. 7A shows two event creation links 512) from a remote computer (e.g., server 102). As noted above, the embedded event creation link 512 contains event information corresponding to multiple parameters for an event described in the web document. In some embodiments, the multiple parameters are determined by server 102 analyzing the web document without human intervention (e.g., using text parsers 230 to automatically analyze the message).

The client changes a visual appearance of the distinct text portion of the web document corresponding to a respective event creation link in the web document in response to a predefined user action (626). In some embodiments, the predefined user action is a selecting action (such as a mouse hover) that does not activate the respective event creation link. FIG. 7B illustrates an example of the change in visual appearance of the distinct text portion is response to a user mouse hover action, wherein the change in visual appearance includes a change to solid underlining of the distinct text portion and the display of an instructional pop-up.

The client receives (or detects) user activation of the event creation link (628). Client 104 receives user input that activates the embedded link, such as the user clicking on embedded event creation link as shown in FIG. 7C. One of ordinary skill in the art would recognize various ways to identify a user-initiated activity, such as recognizing a click-down event and/or click-up event, or monitoring the movement of the cursor over a period of time. This could be done, for example, by browser 317 or operating system 310.

In response to activation of the embedded link, client 104 sends (630) and server 102 receives (632) a request for a calendar entry form. The request includes the event information contained in the event creation link.

In response, the server 102 sends (634) an electronic calendar entry form with multiple fields to the computer associated with the user. In some embodiments, a plurality of the multiple fields contain event information from the event creation link. Because the event parameters have already been determined and placed in an event creation link in the web document, the calendar entry form with at least some of the event parameters filled in can be rapidly sent and displayed by the client. In some embodiments, server 102 stores the electronic calendar entry form (e.g., in calendar entry database 216).

In response to activation of the embedded link, client 104 receives (636) and displays (638) electronic calendar entry form with multiple fields. A plurality of the multiple fields contain event information from the embedded event creation. In some embodiments, the editable electronic calendar entry form further includes a display of an agenda for a user, for example a portion of the user's calendar for a date, or range or times, corresponding to the date and/or time of the event, as shown in FIG. 7C.

The client 104 updates a display of the calendar entry form in response to user action or edit (640). For instance, the client 104 displays a date change affordance (e.g., an interactive calendar pop-up) within or nearby the editable electronic calendar entry form in response to a predefined date change user action (e.g., a user mouse hover action over a calendar icon). For example, FIG. 7D illustrates that a user mouse hover action over the calendar icon causes the client 104 to display an interactive calendar pop-up to appear. Similarly, the client 104 displays a time change affordance within or nearby the editable electronic calendar entry form in response to a predefined time change user action. For example, FIG. 7E illustrates a user mouse hover action over the clock icon that causes the client to display an interactive time selection pop-up to appear. In some embodiments, the client 104 receives modifications to the calendar entry form from the computer user (e.g., by the user typing in modifications to one or more fields or by clicking and selecting various options). Furthermore, in some embodiments, the client will update the portion of the user's agenda that is displayed concurrently with the calendar entry form in response to a user's update to the date or time of the event. For example, as shown in FIG. 7H, a date change causes the client to change the portion of the user's agenda that is displayed from the events of "Fri, Mar. 29, 2013 (e.g., "Lunch with Mike") shown in FIG. 7D to the events of Sat, Mar. 30, 2013 (e.g., "Neighborhood Easter Egg Hunt").

The client 104 receives (642) an indication of acceptance of the created calendar entry from the computer user. In some embodiments, the editable calendar entry form further includes a calendar insertion link or affordance, such as the "add to calendar" button shown in FIG. 7C. As such, the user's request to add the event to the user's calendar is accomplished in these embodiments by the user activating (e.g., clicking on or otherwise selecting) the "add to calendar" button.

In some embodiments, the calendar entry is then stored on the client (644) and/or on the server (620). In some embodiments, the calendar entry is stored on the client (644) and/or on the server (620) without any indication of acceptance by the user (e.g., using an automatic save procedure that saves the calendar entry or changes made to the calendar entry by the user). In some embodiments, a link to the originating web document is also stored in the calendar entry. In some embodiments, the calendar entry and a link to the web document are stored in a calendar for a user in response to activation of the calendar insertion link.

FIGS. 7A-7I are schematic screen shots of exemplary graphical user interfaces for creating an electronic calendar entry from web documents in accordance with embodiments of the present invention.

FIG. 7A illustrates that in some embodiments, GUI 700 includes the following elements, or a subset or superset thereof:

Web document 702, such as an email message 264 (FIG. 5B), which will typically include distinct text portions 704 of the web document associated with a parameter for an event; and One or more embedded event creation links 512; a respective embedded event creation link 512 includes multiple data fields at least some of which are automatically populated with information derived from data (e.g., text and metadata) in email message 702 that is contained in the embedded event creation link.

Text portions 704-1 and 704-2 which are each associated with a parameter for the event.

The two separate text portions 704-1 and 704-2 are lightly underlined with dashes when GUI 700 is first presented, as illustrated in FIG. 7A. The light colored and dashed underlining unobtrusively indicates the existence of the embedded event creation links 512-1 and 512-2. In this example, each embedded link 512 contains event information corresponding to multiple parameters for an event described in the email message. In some embodiments, the multiple parameters are parameters that have been determined by a remote computer (e.g., server 102) analyzing the email message 256 without human intervention. As explained in more detail below, a respective embedded link 512 is configured, upon activation, to initiate generation of an electronic calendar entry form (e.g., FIG. 7C) with multiple fields containing event information from the embedded link 512.

FIG. 7B illustrates that in some embodiments, GUI 700 includes the following elements, or a subset or superset thereof:

Web document 702, one or more embedded event creation links 512, and text portions 704-1 and 704-2, described with respect to FIG. 7A, and additionally a cursor 710 which is used in this example to initiate a predefined user action without activating the event creation link 512-1, and an instructional pop-up 712 near the distinct text portion of the web document 704-1 corresponding to a respective event creation link 512-1 in the web document.

FIG. 7B illustrates that when the text portion 704-1 receives a predefined user action (from the cursor 710) without activating the respective event creation link, the visual appearance of the distinct text portion 704-1 changes from a light colored dashed underlining to a dark and solid underline. Optionally, an instructional pop-up is also provided near the distinct text portion 704-1 in response to the same predefined user action. In some mobile device implementations that use touch inputs received via a touch sensitive screen, a cursor 710 is not displayed.

FIG. 7C illustrates that in some embodiments, GUI 700 includes the following elements, or a subset or superset thereof:

Web document 702, embedded event creation link 512, and text portions 704-1 and 704-2, described with respect to FIG. 7A and the cursor 710 described with respect to FIG. 7B, and additionally an editable electronic calendar entry form 720, with multiple fields containing event information from the event creation link 512-1, the editable electronic calendar entry form 720 includes:

Title field 722 that briefly describes the event (in some embodiments the title is the subject of the email 264;

Date field 724 that lists the date of the event,

Date change link 726 such as the calendar icon,

Time field 728 that lists the time of the event,

Time change link 730 such as the clock icon,

User's agenda 732, displaying events in the user's calendar at or near the time of the event (e.g., all day event 734-1 and timed event 743-2) as well as the event 736 associated with the event creation link tentatively listed in the user's agenda; in some embodiments, each displayed event in the user's agenda 732 includes a link that, if activated by the user, causes the browser to display an event details page for the selected event; and Calendar insertion affordance/link 738 such as the save button/icon that initiates storage of the calendar entry 718 (or 218) in server 102 and/or client 104.

As used herein, an icon is a visual element in a GUI, such as a button or menu item, that initiates execution of a command or program when activated (e.g., clicked on).

FIG. 7D illustrates that in some embodiments, GUI 700 includes the following elements, or a subset or superset thereof:

Web document 702, and text portions 704-1 and 704-2, described with respect to FIG. 7A and the cursor 710 described with respect to FIG. 7B, and the editable electronic calendar entry form 720, with multiple fields described and illustrated with respect to FIG. 7C (for ease of understanding some of the element numbers of some of the fields have been left off of the electronic calendar entry form in FIG. 7D), additionally date change affordance 740, such as the interactive calendar pop-up shown in FIG. 7D, which includes:

a displayed portion (e.g., a month, or week, or other portion) of an interactive calendar, a visual indication 742 of the event date (e.g., the date is bolded), and a movable date selection affordance 744 for selecting a new date in the displayed portion of the interactive calendar.

FIG. 7D illustrates that the date change affordance 740 (such as an interactive calendar pop-up) is displayed within or nearby the user-editable electronic calendar entry form 720 in response to a predefined date change user action such as by a click or hover on the date change link 726 (calendar icon) by the cursor 720.

FIG. 7E illustrates that in some embodiments, GUI 700 includes the following elements, or a subset or superset thereof:

Web document 702, and text portions 704-1 and 704-2, described with respect to FIG. 7A and the cursor 710 described with respect to FIG. 7B, and the user-editable electronic calendar entry form 720, which includes multiple fields that have been described above and illustrated with respect to FIG. 7C, and additionally time change affordance 750 such as interactive time selection pop-up which includes:

a scrollable list of selectable times, a visual indication 752 of the currently selected time (e.g., the time is highlighted), and a movable date selection affordance 754 for selecting a new time.

FIG. 7E illustrates that the time change affordance 750 (such as an interactive time selection pop-up) is displayed within or nearby the user-editable electronic calendar entry form 720 in response to a predefined time change user action, such as a click or hover on the time change link 730 (clock icon) by the cursor 720.

FIG. 7F illustrates that in some embodiments, GUI 700 includes the following elements, or a subset or superset thereof:

Web document 702, and text portions 704-1 and 704-2, described with respect to FIG. 7A, and the editable electronic calendar entry form 720, which includes multiple fields that have been described above and illustrated with respect to FIG. 7C, feedback 760 including:

an "added" message 762 display of a checkmark 764, and display of a calendar editing affordance 766 (e.g., "edit in calendar" button), which enables the user to see event details of the event and to use the full event editing capabilities of the calendar engine 214 (e.g., by invoking calendar application 253 of calendaring server system 102).

FIG. 7F illustrates that in response to activating the calendar insertion link 738 of FIG. 7C, feedback (e.g., that the calendar entry is stored in the calendar for the user) is displayed within or nearby the editable electronic calendar entry form 720. For example, FIG. 7F illustrates that user activation of the "add to calendar" button invokes a display of the feedback 762 "added," display of a checkmark 764, and display of an "edit in calendar" button 766. In some embodiments, a "delete" option is also displayed so that a user can easily and immediately delete a calendar entry created accidentally. Furthermore, in some embodiments, after the user selects the "add to calendar" button, the fields in the pop up electronic calendar entry form 720 become non-editable. In some embodiments, to further edit the calendar entry, the user selects the "edit in calendar" affordance, which accesses a web page in the calendaring server system, and edits the event using the event editing capabilities of calendar application 253 (FIG. 2A).

FIG. 7G illustrates that in some embodiments, GUI 700 includes the following elements, or a subset or superset thereof:
  Web document 702, and text portions 704-1 and 704-2, described with respect to FIG. 7A and the cursor 710 described with respect to FIG. 7B, and the editable electronic calendar entry form 720, with multiple fields described above and illustrated with respect to FIG. 7C, and additionally
  an editable calendar event pop-out 770 with multiple fields including the following elements, or a subset or superset thereof:
    the event repeat field 771,
    location field 772,
    calendar type or calendar name field 773,
    description field 774,
    the event color field 775,
    the reminders field 776,
    availability setting field 777, and
    the privacy settings field 778.

FIG. 7G illustrates that in response to activation of a calendar editing affordance 766 of FIG. 7F, invokes a display of the calendar event page or pop-out 760, where the user can make additional edits to the calendar event. For example, the user has the option of making the event repeat, adding a location, changing which calendar to which the event belongs, adding a description of the event, changing the event color (e.g., background or border color), adding reminders (e.g., reminder type, and amount of time before the event start time), changing availability showings (e.g., whether the user's is shown to be busy, or available, during the event), and changing the privacy settings of the calendar event.

FIG. 7H illustrates that in some embodiments, GUI 700 includes the following concurrently displayed elements, or a subset or superset thereof:
  Web document 702, and text portions 704-1 and 704-2, described with respect to FIG. 7A, the cursor 710 described with respect to FIG. 7B, and the editable electronic calendar entry form 720, including multiple fields that identify and describe an event, as explained above and illustrated with respect to FIG. 7C.
  the user's agenda 732, displaying events in the user's calendar at or near the time of the event (e.g., timed event 743-3) as well as the edited event 736-1 tentatively listed in the user's agenda; and
  date change affordance 740, such as an interactive calendar pop-up, which includes:
    a displayed portion (e.g., a month, or week, or other portion) of an interactive calendar,
    a visual indication 742 of the event date (e.g., the date is bolded), and
    a movable date selection affordance 744 for selecting a new date in the displayed portion of the interactive calendar.

FIG. 7H illustrates that the date change affordance 740 (such as an interactive calendar pop-up) is editable, and that when the movable date selection affordance 744 is used to select a new date, the user selected new date is visually distinguished 742 within the date change affordance 740 and also the new date is displayed in the date field 724. Furthermore, FIG. 7H illustrates that in some embodiments, this update to the date of the event invokes an updated display of the user's agenda 732 on the date of the event. For example, FIG. 7H illustrates that a user action to change a date from "Fri, Mar. 29, 2013" as shown in FIG. 7D, to "Sat, Mar. 30, 2013" causes the display of the user's agenda 732 to update from the events of "Fri, Mar. 29, 2013 (e.g., "Lunch with Mike" 742-2) to the events of Sat, Mar. 30, 2013 (e.g., "Neighborhood Easter Egg Hunt" 742-3).

FIG. 7I illustrates that in some embodiments, GUI 700 includes the following elements, or a subset or superset thereof:
  Web document 702, such as an "web document 1" (274-1, FIG. 2A)
  Distinct text portions 704-3 and 704-4 of the web document each associated with one or more parameters for an event; and
  Embedded event creation links 512-1 and 512-2 that each includes multiple data fields at least some of which are automatically populated with information derived from data (e.g., text and metadata) in web document 702 that is contained in the embedded event creation link.

FIG. 7I illustrates that in some embodiments, a single compound text portion 704-3 for a single event creation link 512-1 is visually distinguished in the web document. For instance, if only one word separates the first parameter and the complementary parameter, then a single compound text portion is provided in the web document as illustrated in FIG. 7I.

FIG. 7I also illustrates that in some embodiments, the web document includes one or more event creation links associated with distinct events. For example, FIG. 7I illustrates that another text portion 704-4 may be presented for a separate event creation link 512-2 associated with a separate event.

The text portions 704-3 and 704-4 are each lightly underlined with dashes when GUI 700 is first presented to the user, as illustrated in FIG. 7I. The light colored and dashed underlining unobtrusively indicates the existence of the embedded event creation links 512-1 and 512-2. Each embedded link 512 contains event information corresponding to multiple parameters for the event described in the web document. In some embodiments, the multiple parameters are parameters that have been determined by a remote computer (e.g., server 102) analyzing the web document (e.g., email message 256) without human intervention. The additional functionality of the embedded event creation links 512-1 and 512-2 is the same as those described in FIGS. 7B-7H. For instance, the embedded link 512-2 is configured, upon activation, to initiate generation of an electronic calendar entry form similar to that shown in FIG. 7C (but with multiple fields containing event information from the embedded link 512-2, which would be related to an event taking place on Apr. 25, 2013 at 8 pm.)

Figure 8A:
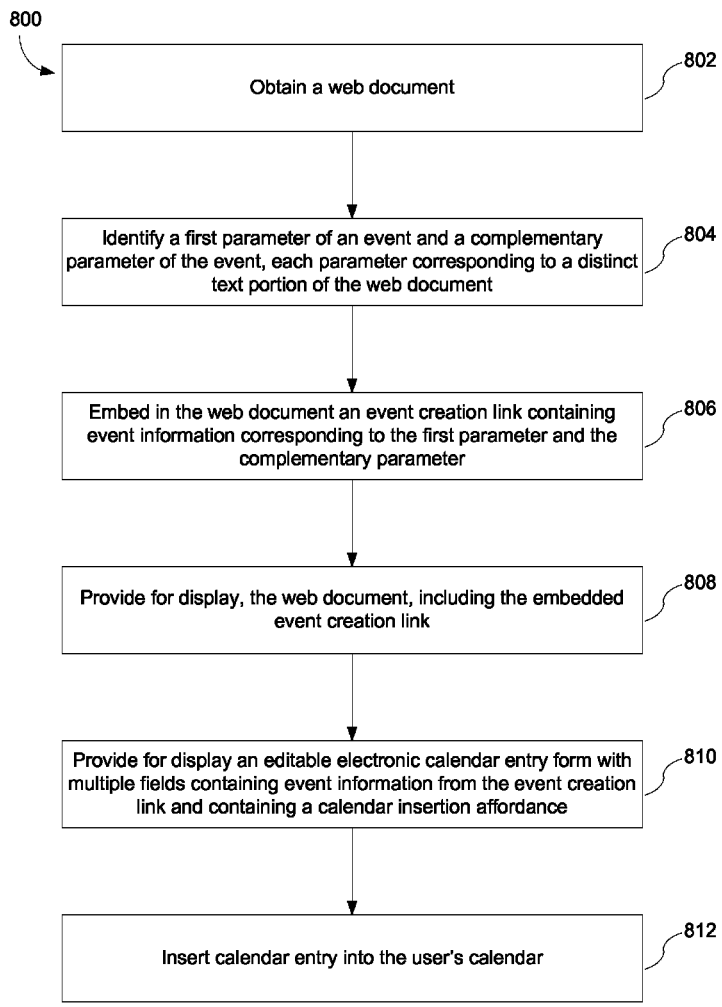
FIGS. 8A and 8B are flowcharts representing method(s) of clustering event parameters in accordance with some embodiments.
Figure 8B:
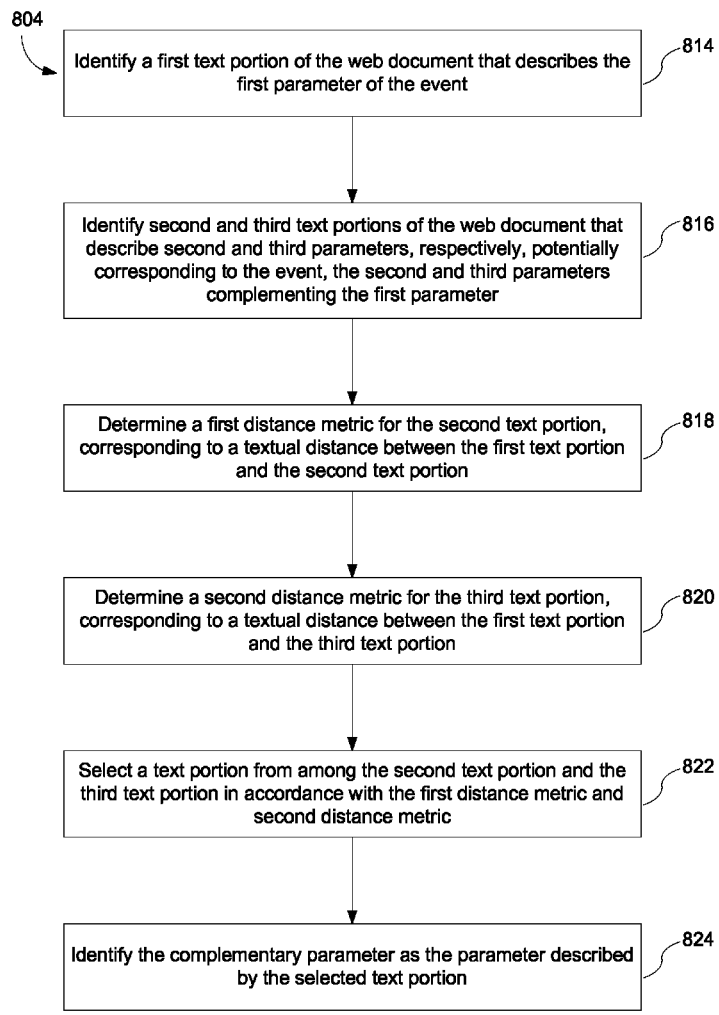

FIGS. 8A and 8B are flowcharts representing a method 800 for clustering event parameters in accordance with some embodiments. The method 800 is typically governed by instructions that are stored in a computer readable storage medium and that are executed by one or more processors of one or more servers. Each of the operations shown in FIGS. 8A and 8B typically corresponds to instructions stored in a computer memory or non-transitory computer readable storage medium. The computer readable storage medium typically includes a magnetic or optical disk storage device, solid state storage devices such as Flash memory, or other non-volatile memory device or devices. The computer readable instructions stored on the computer readable storage medium are in source code, assembly language code, object code, byte code or other instruction format that is interpreted by one or more processors. Specifically many of the operations shown in FIGS. 8A and 8B correspond to instructions in the text parsers 230 of the calendaring server system 102 shown in FIGS. 2A-2B. However, it will be appreciated by those of ordinary skill in the art that one or more of the acts described may be performed by hardware, software, or a combination thereof, as may be embodied in one or more computing systems.

A web document is obtained (802). Various types and examples of web documents are described above.

A first parameter of an event is identified, and a parameter complementary to the first parameter is also identified (804). Each parameter corresponds to a distinct text portion of the web document. In some embodiments, the first parameter is a date or a time. In some embodiments, the date or time is determined through temporal expression parsing to resolve ambiguous and/or underspecified expressions (e.g., "tomorrow" is determined to correspond to a date). When there are a plurality of candidate parameters that could potentially serve as the complementary parameter, the complementary parameter is identified from among the plurality of candidate parameters. The complementary parameter is identified in accordance with a distance metric between the text portion of the web document corresponding to the first parameter and the text portion of the web document corresponding to the complementary parameter.

In some circumstances, where the web document is an email message, the complementary parameter (e.g., a date or time parameter) of the event is derived from text in the email message's subject field. For example, if the subject field is the location of the only complementary parameter candidate in the email message, or is the location of the closest complementary parameter candidate (as determined in accordance with the distance metric between the text portion corresponding to the first parameter and the text portion corresponding to the candidate complementary parameter in the email message's subject field), then the complementary parameter of the event is derived from text in the email message's subject field.

Referring to FIG. 7A, in an example of operation 804, the first parameter of the event that is identified is the date, corresponding to text portion 704-1 ("tomorrow"). The complementary parameter that is identified is the time, 8 PM, corresponding to text portion 704-2. In another example (still referring to FIG. 7A), the time, 8 PM, is the first parameter that is identified, and the complementary parameter is selected from among the candidate parameters associated with "tomorrow" and "next Tuesday." Since "tomorrow" has a smaller distance metric to "8 pm" than "next Tuesday", the date parameter associated with "tomorrow" is selected as the complementary parameter. Determination on the distance metrics is discussed below with reference to FIG. 8B.

In some cases, the web document does not contain any text that explicitly provides a complementary parameter. For example, the web document may include text specifying a time, but not a date. In some implementations, when the web document includes a text portion corresponding to a time but does not include a text portion that corresponds to a date, the date parameter is inferred from contextual information in or associated with the web document.

Furthermore, in some embodiments, when the web document includes a text portion corresponding to a time but does not include a text portion that corresponds to a date, or the text portion that corresponds to a date specifies a date that is in the past, the date parameter is set to either the current date ("today"), or the date for the next day ("tomorrow"), depending on the time in the first parameter. The aforementioned circumstance is herein called a first condition precedent, i.e., the web document includes a text portion corresponding to a time but does not include a text portion that corresponds to a date, or the text portion that corresponds to a date specifies a date that is in the past. When the first condition precedent is determined to be true (e.g., when the method 800 is being performed, or when a user clicks on or otherwise selects an event creation link having at least a time parameter): if the time specified by the first parameter is in the past (for example, it is currently 12:30 PM at the user's location, and the first time parameter specifies a time equal to 11:30 AM), the complementary parameter is set to the date for the day following the current date (i.e., "tomorrow" at the user's location); and if the time specified by the first parameter is in the future (for example, it's currently 12:30 PM at the user's location, and the first time parameter specifies a time equal to 1:30 PM), the complementary parameter is set to the current date (i.e., "today" at the user's location).

In some embodiments, however, if a complementary parameter cannot be inferred with high confidence, an event creation link that includes the first parameter (e.g., a date), but no complementary parameter (e.g., a time), is embedded in the web document.

Then (after both a first parameter and a complementary parameter have been identified, 804), an event creation link is created and embedded in the web document (806). The event creation link contains event information corresponding to at least the first parameter and the complementary parameter. For example, as explained with respect to FIG. 6A (604), in some embodiments, the text parsers 230 determine date, time, and title parameters for the event and create the embedded event creation link containing the determined parameters. For example, the event creation link discussed with respect to the example described in FIG. 6A was:

http://www.abc.com/calendar/
event?action=TEMPLATE&pprop=mailID:xxx
xxxxxxx&dates=20130307T190000/
????????T??????&text=Pizza In some embodiments, a complementation function determines whether the parameters should be merged and provided as a single event creation link.

Then the system provides the web document, which includes the embedded event creation link (808). In some embodiments, the web document includes one or more event creation links associated with distinct events. In other embodiments, only one event creation link is provided, although it may be actionable from one or more distinct text portions of the web document, each associated with a respective parameter for the event. In some embodiments, if only one word separates the first parameter and the complementary parameter, then a single event creation link is provided in the web document and is associated with a compound text portion including both parameters and the intervening word. In some other embodiments, an event creation link is provided for the text portion associated with a date and another event creation link with the same event parameters is also provided for the text portion associated with the time of the event in the web document. Although the event creation links contain the same information (the first parameter and complementary parameter), the event creation lines are located at two distinct areas in the web document, as illustrated for example in FIGS. 7A and 7B.

An editable electronic calendar entry form with multiple fields containing event information from the event creation link and containing a calendar insertion affordance is provide for display in response to a user's activation of the event creation link (810). Then, after receiving or detecting user activation of the calendar insertion affordance, the system inserts the calendar entry into the user's calendar (812).

FIG. 8B provides more detail regarding the identifying a first parameter of an event and a parameter complementary to the first parameter of (804). Specifically, a first text portion of the web document that describes the first parameter of the event is identified (814). Then second and third text portions of the web document that describe second and third parameters, respectively, are identified (816). The second and third parameters potentially correspond to the event, and complement the first parameter. For example, the first parameter may be a time of day for an event (e.g., 8 PM, corresponding to "8 pm" in FIG. 7A) and the second and third parameters may be potential dates for an event (e.g., dates corresponding to "tomorrow" and "next Tuesday" in FIG. 7A).

A first distance metric is determined for the second text portion, corresponding to a textual distance between the first text portion and the second text portion (818). A second distance metric is determined for the third text portion, corresponding to a textual distance between the first text portion and the third text portion (820). A distance metric comprises a sum of values corresponding to intermediary textual elements between the text portion of the web document corresponding to the first parameter and the text portion of the web document corresponding to the complementary parameter. For instance, in some embodiments, the intermediary textual elements include at least one word having a first corresponding value in the sum of values and at least one textual element other than a word having a second corresponding value in the sum of values, the second corresponding value distinct from the first corresponding value. In some embodiments, separator textual elements, are assigned a second corresponding value (e.g., 2), which is greater than a default value (e.g., 1) associated with the word textual elements. Separator elements include one or more of: bracket elements (e.g., opening and closing parentheses, curly braces or brackets, square brackets, and less than and greater than signs: ( ) { } [ ] < >), punctuation elements (e.g., period/dot, semicolon, exclamation mark, question mark: . ; ! ?), and new line elements (e.g., \n). In some embodiments, joiner textual elements are assigned a value (e.g., 0) less than a default value associated with the word textual elements (e.g., 1). Joiner elements include one or more of: such as hyphens, dashes and whitespace (e.g., white space character, U+200C, ZERO WIDTH NON-JOINER, U+200D, ZERO WIDTH JOINER, and soft hyphen.) In some embodiments, all of the textual elements are found in a single email, while in other embodiments, quoted text from another email in an email thread is also evaluated. In some embodiments, the title of an email is also evaluated to determine if it contains event parameters or candidate event parameters. For instance, in some embodiments, if an event parameter exists in the title (e.g., subject line) of an email message, it is identified as the first text portion that describes the first parameter of the event.

A text portion is selected (from among the second text portion and the third text portion) in accordance with the first distance metric (for the second text portion) and the second distance metric (for the third text portion) (822). In some embodiments, the complementary parameter is identified in accordance with at least the first and second distance metrics, and also a reading direction associated with the web document. For example, in some embodiments when the first and second distance metrics are equal, the reading direction is used to break the tie. In particular, the parameter corresponding to the text portion preceding the first text portion, in accordance with the reading direction, is selected. Then, the complementary parameter is identified as the parameter described by the selected text portion (824). As such, in some embodiments, the complementary parameter is identified in accordance with at least first and second distance metrics, between a first text portion of the web document corresponding to the first parameter and, respectively, second and third text portions of the web document corresponding to second and third candidate parameters of the plurality of candidate parameters.

Referring to FIG. 7A, the first distance metric for the distance between "8 pm" and "tomorrow," using the exemplary values discussed above, would be 5 (i.e., 3 (for three words)+2 (for one separator element)). The second distance metric for the distance between "8 pm" and "next Tuesday," using the exemplary values discussed above, would be 8 (i.e., 6 (for six words)+2 (for one separator element)). In this example, the first distance metric is less than the second distance metric, and therefore the complementary parameter is the date associated with "tomorrow".

Each of the methods described herein is typically governed by instructions that are stored in a computer readable storage medium and that are executed by one or more processors of one or more servers or clients. The above identified modules or programs (i.e., sets of instructions) need not be implemented as separate software programs, procedures or modules, and thus various subsets of these modules will be combined or otherwise re-arranged in various embodiments. Each of the operations shown in FIGS. 6A, 6B, 8A and 8B-typically corresponds to instructions stored in a computer memory or non-transitory computer readable storage medium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, performed on a computer system having one or more processors and memory storing one or more programs for execution by the one or more processors, the method comprising:

identifying, in a document, a first parameter of an event, a second parameter complementary to the first parameter, and a third parameter complementary to the first parameter, each of the first parameter, the second parameter, and the third parameter corresponding to a distinct text portion of the document;

determining a first textual distance of the second parameter from the first parameter within the document, the determining the first textual distance including assigning a first value to words between the first parameter and the second parameter, a second value to separator textual elements between the first parameter and the second parameter, and a third value to joiner textual elements between the first parameter and the second parameter, the first value, second value, and third value being different from each other;

determining a second textual distance of the third parameter from the first parameter within the document, the determining the second textual distance including assigning the first value to words between the first parameter and the third parameter, the second value to separator textual elements between the first parameter and the third parameter, and the third value to joiner textual elements between the first parameter and the third parameter;

selecting either the second parameter or the third parameter as a complementary parameter based on which of the first textual distance and the second textual distance is shorter;

embedding in the document an event creation link containing event information corresponding to at least the first parameter and the complementary parameter; and providing for display, the document, the document including the embedded event creation link.

2. The method of claim 1, wherein the selecting the complementary parameter includes selecting either the second parameter or the third parameter as the complementary parameter based on which of the first textual distance and the second textual distance is shorter and a reading direction associated with the document.

3. The method of claim 1, wherein the first and second textual distances each comprise a sum of values corresponding to intermediary textual elements between the text portion of the document corresponding to the first parameter and the text portions of the document corresponding to the second and third parameters.

4. The method of claim 3, wherein the intermediary textual elements include at least one word having a first corresponding value in the sum of values and at least one textual element other than a word having a second corresponding value in the sum of values, the second corresponding value being distinct from the first corresponding value.

5. The method of claim 1, further including:
in response to activation of the event creation link, providing for display an editable electronic calendar entry form with multiple fields and a calendar insertion link, wherein a plurality of the multiple fields contain event information from the event creation link.

6. The method of claim 5, further including:
after user activation of the calendar insertion link, inserting the calendar entry into a user's calendar.

7. The computer-implemented method of claim 1, wherein one of the first parameter and the complementary parameter is a date and the other of the first parameter and the complementary parameter is a time.

8. A computer system, comprising:
one or more processors; and
memory storing one or more programs to be executed by the one or more processors, the one or more programs comprising instructions for:

identifying, in a document, a first parameter of an event, a second parameter complementary to the first parameter, and a third parameter complementary to the first parameter, each of the first parameter, the second parameter, and the third parameter corresponding to a distinct text portion of the document;

determining a first textual distance of the second parameter from the first parameter within the document, the determining the first textual distance including assigning a first value to words between the first parameter and the second parameter, a second value to separator textual elements between the first parameter and the second parameter, and a third value to joiner textual elements between the first parameter and the second parameter, the first value, second value, and third value being different from each other;

determining a second textual distance of the third parameter from the first parameter within the document, the determining the second textual distance including assigning the first value to words between the first parameter and the third parameter, the second value to separator textual elements between the first parameter and the third parameter, and the third value to joiner textual elements between the first parameter and the third parameter;

selecting either the second parameter or the third parameter as a complementary parameter based on which of the first textual distance and the second textual distance is shorter;

embedding in the document an event creation link containing event information corresponding to at least the first parameter and the complementary parameter; and providing for display, the document, the document including the embedded event creation link.

9. The system of claim 8, wherein the selecting the complementary parameter includes selecting either the second parameter or the third parameter as the complementary parameter based on which of the first textual distance and the second textual distance is shorter and a reading direction associated with the document.

10. The system of claim 8, wherein the first and second textual distances each comprise a sum of values corresponding to intermediary textual elements between the text portion of the document corresponding to the first parameter and the text portions of the document corresponding to the second and third parameters.

11. The system of claim 10, wherein the intermediary textual elements include at least one word having a first corresponding value in the sum of values and at least one textual element other than a word having a second corresponding value in the sum of values, the second corresponding value being distinct from the first corresponding value.

12. The system of claim 8, further including instructions for:
providing for display, in response to activation of the event creation link, an editable electronic calendar entry form with multiple fields and a calendar insertion link, wherein a plurality of the multiple fields contain event information from the event creation link.

13. The system of claim 8, wherein one of the first parameter and the complementary parameter is a date and the other of the first parameter and the complementary parameter is a time.

14. A non-transitory computer readable storage medium storing one or more programs configured for execution by a computer, the one or more programs comprising instructions for:
- identifying, in a document, a first parameter of an event, a second parameter complementary to the first parameter, and a third parameter complementary to the first parameter, each of the first parameter, the second parameter, and the third parameter corresponding to a distinct text portion of the document;
- determining a first textual distance of the second parameter from the first parameter within the document, the determining the first textual distance including assigning a first value to words between the first parameter and the second parameter, a second value to separator textual elements between the first parameter and the second parameter, and a third value to joiner textual elements between the first parameter and the second parameter, the first value, second value, and third value being different from each other;
- determining a second textual distance of the third parameter from the first parameter within the document, the determining the second textual distance including assigning the first value to words between the first parameter and the third parameter, the second value to separator textual elements between the first parameter and the third parameter, and the third value to joiner textual elements between the first parameter and the third parameter;
- selecting either the second parameter or the third parameter as a complementary parameter based on which of the first textual distance and the second textual distance is shorter;
- embedding in the document an event creation link containing event information corresponding to at least the first parameter and the complementary parameter; and
- providing for display, the document, the document including the embedded event creation link.

15. The non-transitory computer readable storage medium of claim 14, wherein the selecting the complementary parameter includes selecting either the second parameter or the third parameter as the complementary parameter based on which of the first textual distance and the second textual distance is shorter and a reading direction associated with the document.

16. The non-transitory computer readable storage medium of claim 14, wherein the first and second textual distances each comprise a sum of values corresponding to intermediary textual elements, between the text portion of the document corresponding to the first parameter and the text portions of the document corresponding to the second and third parameters.

17. The non-transitory computer readable storage medium of claim 16, wherein the intermediary textual elements include at least one word having a first corresponding value in the sum of values and at least one textual element other than a word having a second corresponding value in the sum of values, the second corresponding value being distinct from the first corresponding value.

18. The non-transitory computer readable storage medium of claim 14, further including instructions for:
- providing for display, in response to activation of the event creation link, an editable electronic calendar entry form with multiple fields and a calendar insertion link, wherein a plurality of the multiple fields contain event information from the event creation link.

19. The non-transitory computer readable storage medium of claim 14, wherein one of the first parameter and the complementary parameter is a date and the other of the first parameter and the complementary parameter is a time.

* * * * *